(12) United States Patent
Yamaguchi et al.

(10) Patent No.: US 12,224,785 B2
(45) Date of Patent: Feb. 11, 2025

(54) TUNER IC

(71) Applicant: Sony Semiconductor Solutions Corporation, Atsugi (JP)

(72) Inventors: Toshihiro Yamaguchi, Atsugi (JP); Hiroshi Shono, Atsugi (JP)

(73) Assignee: Sony Semiconductor Solutions Corporation, Atsugi (JP)

( * ) Notice: Subject to any disclaimer, the term of this patent is extended or adjusted under 35 U.S.C. 154(b) by 485 days.

(21) Appl. No.: 17/628,130

(22) PCT Filed: Aug. 6, 2020

(86) PCT No.: PCT/JP2020/030116
§ 371 (c)(1),
(2) Date: Jan. 18, 2022

(87) PCT Pub. No.: WO2021/033554
PCT Pub. Date: Feb. 25, 2021

(65) Prior Publication Data
US 2022/0263530 A1    Aug. 18, 2022

(30) Foreign Application Priority Data

Aug. 19, 2019  (JP) ................................ 2019-149766

(51) Int. Cl.
*H04B 1/10*   (2006.01)
*H04B 7/185*  (2006.01)
(Continued)

(52) U.S. Cl.
CPC ....... *H04B 1/1036* (2013.01); *H04B 7/18526* (2013.01); *H04B 7/18539* (2013.01); *H04N 21/426* (2013.01); *H04N 21/4382* (2013.01)

(58) Field of Classification Search
CPC .............. H04B 1/1036; H04B 7/18526; H04B 7/18539; H04B 1/16; H04B 7/18523;
(Continued)

(56) References Cited

U.S. PATENT DOCUMENTS

2003/0224736 A1   12/2003  Lin
2005/0240969 A1   10/2005  Sasaki et al.
(Continued)

FOREIGN PATENT DOCUMENTS

JP     2002009863 A    1/2002
JP     2007-110761 A   4/2007
(Continued)

OTHER PUBLICATIONS

International Search Report issued Oct. 13, 2020 in PCT/JP2020/030116 filed Aug. 6, 2020, 2 pages.

*Primary Examiner* — Lana N Le
(74) *Attorney, Agent, or Firm* — Oblon, McClelland, Maier & Neustadt, L.L.P.

(57) ABSTRACT

The present technology relates to a tuner IC capable of reducing the cost of a demodulation LSI.

A tuner includes an IF output terminal configured to output an IF signal of terrestrial broadcasting, a first output terminal configured to output the IF signal or one of BB signals that are output signals of satellite digital broadcasting and have orthogonal phases, and a second output terminal configured to output another of the BB signals. The present technology can be applied to a broadcast receiving system.

3 Claims, 13 Drawing Sheets

(51) Int. Cl.
*H04N 21/426* (2011.01)
*H04N 21/438* (2011.01)

(58) Field of Classification Search
CPC .... H04N 21/426; H04N 21/4382; H04N 5/50;
H04N 5/455; H04N 7/20; H04N 5/46;
H04N 21/4263
See application file for complete search history.

(56) References Cited

U.S. PATENT DOCUMENTS

| | | | |
|---|---|---|---|
| 2006/0003729 A1* | 1/2006 | Tuttle | H04B 1/16 455/333 |
| 2007/0118859 A1 | 5/2007 | Tsukahara | |
| 2009/0064239 A1* | 3/2009 | Hara | H04N 21/4382 725/68 |
| 2014/0024326 A1* | 1/2014 | Imai | H04B 7/18529 455/199.1 |
| 2015/0382049 A1* | 12/2015 | Fujii | H04N 5/50 348/706 |
| 2020/0412458 A1* | 12/2020 | Asami | H04B 1/16 |
| 2022/0182088 A1* | 6/2022 | Yu | H04B 1/1036 |

FOREIGN PATENT DOCUMENTS

| | | |
|---|---|---|
| JP | 2013-31149 A | 2/2013 |
| JP | 2014-171058 A | 9/2014 |
| JP | 2015-167324 A | 9/2015 |
| WO | WO-2018037687 A1 | 3/2018 |
| WO | WO-2023184395 A1 * | 10/2023 |

* cited by examiner

FIG. 5

| CONTROL NAME | IF OUTPUT | TERRESTRIAL | | SATELLITE |
| --- | --- | --- | --- | --- |
| | | IF OUTPUT TO I | IQ OUTPUT | |
| CONTROL FOR SWITCHING BETWEEN TERRESTRIAL BROADCASTING AND SATELLITE BROADCASTING | L | L | L | H |
| CONTROL FOR SWITCHING BETWEEN IF AND IQ | L | L | H | H |
| CONTROL FOR SWITCHING TERRESTRIAL WAVE OUTPUT DESTINATION | L | H | — | — |
| CONTROL FOR SWITCHING BETWEEN TERRESTRIAL IF AND TERRESTRIAL IQ | — | L | H | H |

FIG. 7

| CONTROL NAME | | IF OUTPUT | TERRESTRIAL IF OUTPUT TO I | IQ OUTPUT | SATELLITE |
|---|---|---|---|---|---|
| CONTROL FOR SWITCHING BETWEEN TERRESTRIAL BROADCASTING AND SATELLITE BROADCASTING | | L | L | L | H |
| CONTROL FOR SWITCHING TERRESTRIAL WAVE OUTPUT DESTINATION { SWITCHING AT THE TIME OF VIEWING } | | L | H | — | — |
| CONTROL FOR SWITCHING BETWEEN TERRESTRIAL IF AND TERRESTRIAL IQ { FIXED AT THE TIME OF INITIAL SETTING } | | L | L | H | — |
| INTERNAL CONTROL LINE | A1 | L | L | L | H |
| | B1 | L | L | H | H |
| | C1 | L | H | — | H |
| | D1 | L | L | H | H |

TUNER IC

TECHNICAL FIELD

The present technology relates to a tuner IC, and more particularly to a tuner IC capable of reducing the cost of a demodulation LSI.

BACKGROUND ART

At present, terrestrial digital broadcasting and satellite digital broadcasting have become widespread all over the world.

In a case where one circuit is provided with reception functions of broadcast signals broadcasted in different frequency bands such as frequency bands of the terrestrial digital broadcasting and the satellite digital broadcasting, the overall circuit scale tends to be large if each of the reception functions is separately implemented. In a case where such a circuit is configured as a large-scale integrated circuit (LSI), the layout area increases.

Therefore, a technology has been disclosed in which a predetermined circuit is shared in circuits of terrestrial digital broadcasting and satellite digital broadcasting so that the circuit scale is reduced (see Patent Documents 1 and 2).

CITATION LIST

Patent Document

Patent Document 1: Japanese Patent Application Laid-Open No. 2013-031149
Patent Document 2: Japanese Patent Application Laid-Open No. 2015-167324

SUMMARY OF THE INVENTION

Problems to be Solved by the Invention

In a conventional demodulation LSI that demodulates signals of the terrestrial digital broadcasting and the satellite digital broadcasting, three analog digital converters (ADCs) are independently required for inputting an IF signal for the terrestrial digital broadcasting and inputting a BB(I) signal and a BB(Q) signal for the satellite digital broadcasting. However, the ADCs each have a large layout size and cause an increase in the cost of the demodulation LSI.

The present technology has been made in view of such a situation, and makes it possible to reduce the cost of the demodulation LSI.

Solutions to Problems

A tuner IC according to one aspect of the present technology includes: an IF output terminal configured to output an IF signal that is an output signal of terrestrial broadcasting; a first output terminal configured to output the IF signal or one of BB signals that are output signals of satellite digital broadcasting and have orthogonal phases; and a second output terminal configured to output another of the BB signals.

In one aspect of the present technology, the IF output terminal outputs the IF signal that is an output signal of the terrestrial broadcasting, and the first output terminal outputs the IF signal or one of the BB signals that are output signals of the satellite digital broadcasting and have orthogonal phases. In addition, the second output terminal outputs the another of the BB signals.

BRIEF DESCRIPTION OF DRAWINGS

FIG. 5 is a diagram illustrating values of control lines set at the time of channel selection.
FIG. 7 is a diagram illustrating values set for each type of control and each internal control line in FIG. 6.

MODE FOR CARRYING OUT THE INVENTION

Hereinafter, modes for carrying out the present technology will be described. The description will be made in the following order.

<0. Overview>
<1. First Embodiment>
<2. Second Embodiment>
<3. Third Embodiment>

0. Overview

Configuration Example of Conventional Broadcast Receiving System

Figure 1:
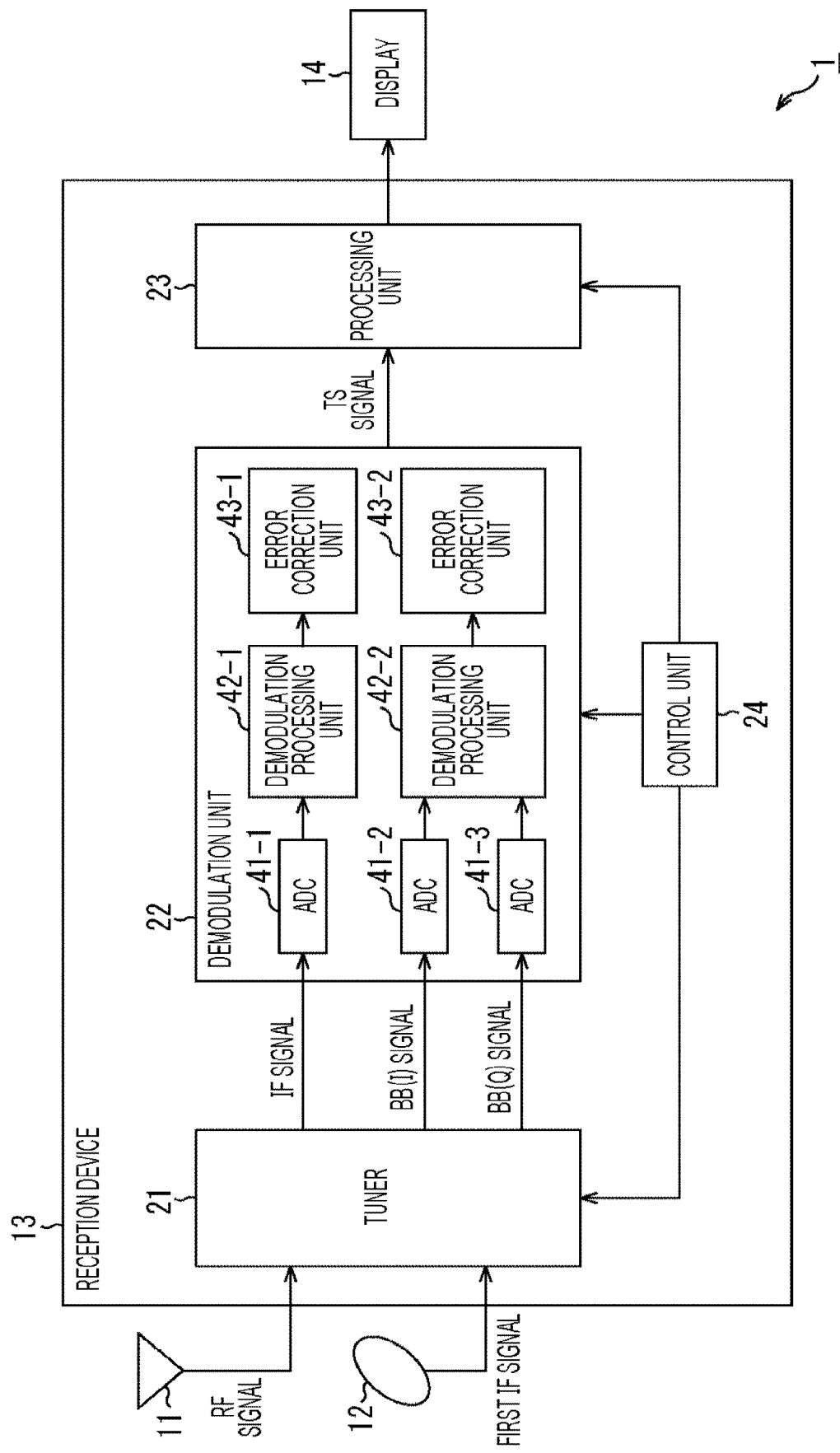
FIG. 1 is a block diagram illustrating a configuration example of a conventional broadcast receiving system.

FIG. 1 is a block diagram illustrating a configuration example of a conventional broadcast receiving system.

A broadcast receiving system 1 in FIG. 1 is a broadcast receiving system that receives broadcast signals of terrestrial digital broadcasting and cable digital broadcasting and a broadcast signal of satellite digital broadcasting.

The broadcast receiving system 1 includes a terrestrial broadcasting antenna 11, a satellite digital broadcasting antenna 12, a reception device 13, and a display 14.

The terrestrial broadcasting antenna 11 receives a terrestrial digital broadcast wave transmitted from a transmission device of a broadcast station (not illustrated), and outputs a radio frequency (RF) signal to the reception device 13. The broadcast wave of terrestrial broadcasting is modulated and transmitted by the transmission device. A cable digital broadcast wave is transmitted by a cable, and the cable is connected to the reception device 13 instead of the terrestrial broadcasting antenna 11.

Note that the frequency band of an RF signal of the terrestrial digital broadcasting and the frequency band of an RF signal of the cable digital broadcasting are close frequency bands, and substantially the same processing is performed on the RF signal of the terrestrial digital broadcasting and the RF signal of the cable digital broadcasting. Therefore, hereinafter, the terrestrial digital broadcasting and the cable digital broadcasting will be collectively referred to as terrestrial broadcasting in a case where it is not particularly necessary to distinguish the terrestrial digital broadcasting and the cable digital broadcasting.

The satellite digital broadcasting antenna 12 receives a satellite digital broadcasting wave transmitted from a satellite transmission device (not illustrated). The satellite digital broadcasting antenna 12 includes a frequency converter (not illustrated). The satellite digital broadcasting antenna 12 performs frequency conversion on an RF signal using the frequency converter, and outputs a first IF signal, which is a signal after the frequency conversion, to the reception device 13.

The reception device 13 includes a tuner 21, a demodulation unit 22, a processing unit 23, and a control unit 24.

The tuner 21 includes one chip (semiconductor chip) such as an IC. The tuner 21 selects the frequency of a channel desired by a user under the control of the control unit 24. The tuner 21 amplifies an RF signal of the selected frequency and converts the frequency of the RF signal into a low frequency.

At this time, the RF signal of the terrestrial broadcasting is converted into an IF signal, which is a signal of an IF frequency of about 4 MHz, by a detection method called a "superheterodyne method".

The first IF signal of the satellite digital broadcasting is converted into baseband (BB) signals of 0 MHz to several 10 MHz by a detection method called a "direct conversion method". The BB signals include an I signal (0 degrees) and a Q signal (90 degrees) whose phases are orthogonal to each other. Hereinafter, the BB signals will also be referred to as IQ signals. In addition, the I signal of the BB signals will be referred to as a BB(I) signal, and the Q signal of the BB signals will be referred to as a BB(Q) signal.

The tuner 21 includes an output terminal that outputs the IF signal, an output terminal that outputs the BB(I) signal, and an output terminal that outputs the BB(Q) signal, and outputs the signal from each of the output terminals to a corresponding analog digital converter (ADC) of the demodulation unit 22.

The demodulation unit 22 performs demodulation processing under the control of the control unit 24. The demodulation unit 22 includes ADCs 41-1 to 41-3, demodulation processing units 42-1 and 42-2, and error correction units 43-1 and 43-2.

The ADCs 41-1 to 41-3 respectively convert the IF signal, the BB(I) signal, and the BB(Q) signal, which are analog signals supplied from the tuner 21, into digital signals.

The ADC 41-1 converts the IF signal into a digital signal, and outputs the converted digital signal to the demodulation processing unit 42-1. The ADC 41-2 converts the BB(I) signal into a digital signal, and outputs the converted digital signal to the demodulation processing unit 42-2. The ADC 41-3 converts the BB(Q) signal into a digital signal, and outputs the converted digital signal to the demodulation processing unit 42-2.

The demodulation processing units 42-1 and 42-2 perform the demodulation processing on the converted digital signals, and output the demodulated signals to the error correction units 43-1 and 43-2, respectively.

The error correction units 43-1 and 43-2 perform error correction on the demodulated signals and output, for example, transport stream (TS) signals obtained as a result of the error correction to the processing unit 23.

Under the control of the control unit 24, the processing unit 23 performs demux processing, demultiplexing processing, and decoding processing on data of the TS signals supplied from the error correction units 43-1 and 43-2.

The demux processing is, for example, processing of separating video content into a video portion, an audio portion, a subtitle portion, and the like. The demultiplexing processing is processing of separating, for example, video data and audio data included in the data. The decoding processing is processing of generating a video signal by decoding the video data, and the generated video signal is output to the display 14. Furthermore, the decoding processing is processing of generating an audio signal by decoding the audio data, and the generated audio signal is output to a speaker (not illustrated).

The control unit 24 includes a central processing unit (CPU), a read only memory (ROM), a random access memory (RAM), and the like. The control unit 24 executes a program stored in the ROM or the like, and controls the tuner 21, the demodulation unit 22, and the processing unit 23 according to a user instruction signal from an operation input unit (not illustrated).

The display 14 displays a video image representing the video signal supplied from the processing unit 23.

Configuration Example of Conventional Tuner

Figure 2:
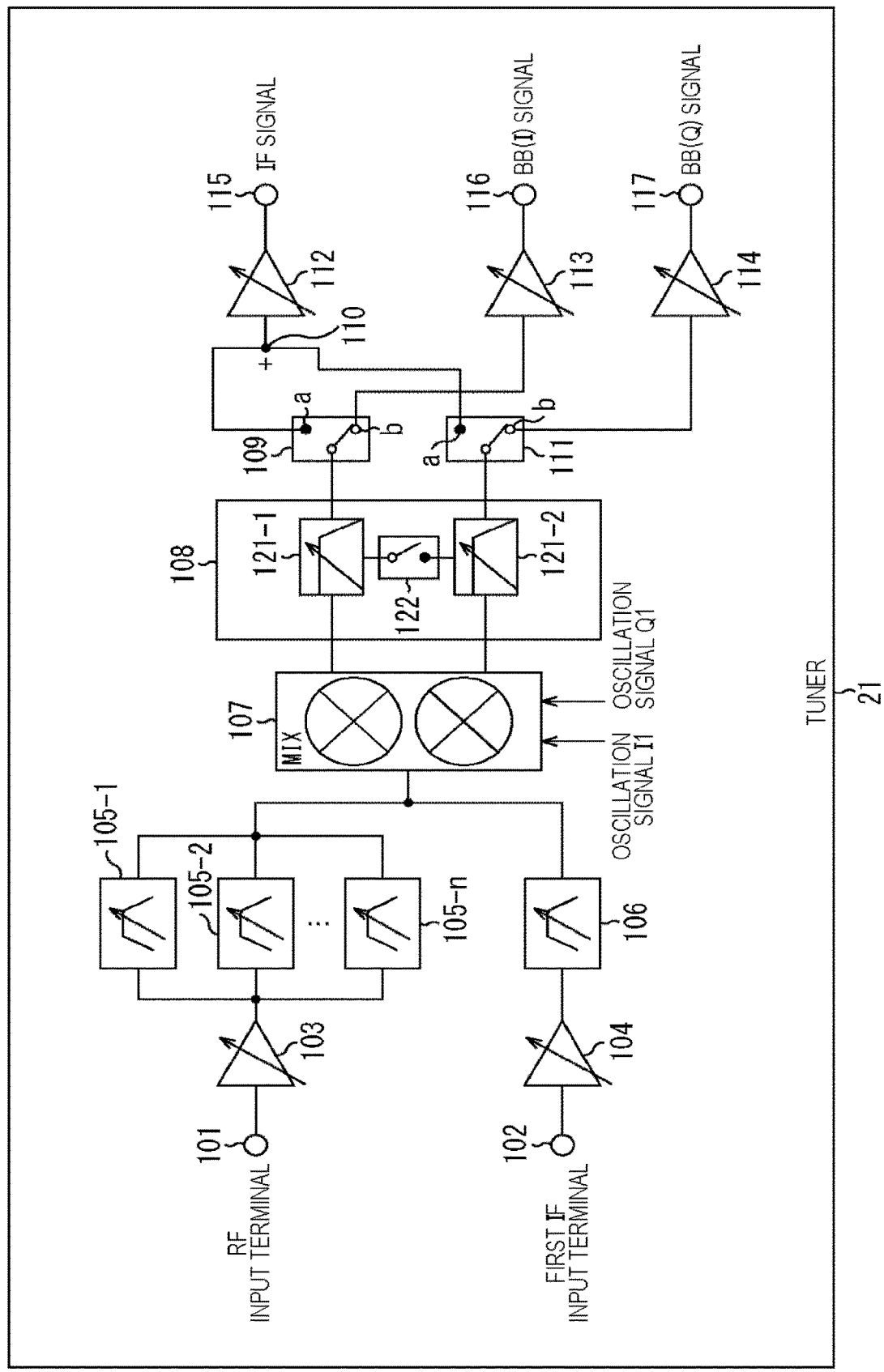
FIG. 2 is a diagram illustrating a configuration example of a tuner in FIG. 1.

FIG. 2 is a diagram illustrating a configuration example of the tuner in FIG. 1.

The tuner 21 in FIG. 2 includes an RF input terminal 101, a first IF input terminal 102, RF voltage gain amplifiers (VGAs (RFVGAs)) 103 and 104, RF filters 105-1 to 105-$n$, an RF filter 106, and a mixer (MIX) 107. Furthermore, the tuner 21 includes a complex filter/low pass filter (LPF) 108, a switch 109, an IQ combiner 110, a switch 111, an IF VGA (IFVGA) 112, BB VGAs (BBVGAs) 113 and 114, an output terminal 115, an output terminal 116, and an output terminal 117.

The RF input terminal 101 receives the RF signal, which is a terrestrial broadcast signal supplied from the terrestrial broadcasting antenna 11, and outputs the RF signal to the RFVGA 103.

The first IF input terminal 102 receives the first intermediate frequency (IF) signal supplied from the satellite digital broadcasting antenna 12, which is a signal obtained by frequency conversion on the RF signal as a satellite digital broadcast signal, and outputs the first IF signal to the RFVGA 104.

The RFVGAs 103 and 104 are VGAs whose amplification degree can be varied by a control voltage that changes according to the magnitude of the signal level of the RF signal. The RFVGA 103 amplifies the RF signal supplied from the RF input terminal 101. The RF signal is supplied to an RF filter of a frequency band corresponding to the frequency of a selected channel among the RF filters 105-1 to 105-$n$.

The RFVGA 104 amplifies the first IF signal supplied from the first IF input terminal 102. The first IF signal is supplied to the RF filter 106.

The RF filters 105-1 to 105-$n$ include a plurality of RF filters corresponding to frequencies of channels of the terrestrial broadcasting. Each of the RF filters 105-1 to 105-*n* corresponding to the frequency of a channel performs filtering by tuning the frequency of the RF signal supplied from the RFVGA 103 to the frequency of the channel. The RF signal filtered by one of the RF filters 105-1 to 105-*n* is output to the MIX 107.

Note that, hereinafter, the RF filters 105-1 to 105-*n* will be referred to as an RF filter 105 in a case where it is not particularly necessary to distinguish the RF filters 105-1 to 105-*n*.

The RF filter 106 includes an RF filter corresponding to the frequency of the satellite digital broadcasting. The RF filter 106 performs filtering by tuning the frequency of the first IF signal supplied from the RFVGA 104 to the frequency of the RF filter 106. The first IF signal filtered by the RF filter 106 is output to the MIX 107.

The MIX 107 is a frequency conversion circuit (mixer) that converts a high frequency of the RF into a low frequency of the IF or baseband (BB). When the filtered RF signal or first IF signal is supplied to the MIX 107, an oscillation signal I1 of the I signal (0 degrees) and an oscillation signal Q1 of the Q signal (90 degrees) whose phases are orthogonal to each other are also supplied to the MIX 107.

The RF signal is frequency-converted into an IF(I) signal and an IF(Q) signal by the oscillation signal I1 and the oscillation signal Q1 supplied to the MIX 107 and supplied to the complex filter/LPF 108. At this time, an image component may be added to the IF(I) signal and the IF(Q) signal.

The first IF signal is frequency-converted into the BB(I) signal and the BB(Q) signal by the oscillation signal I1 and the oscillation signal Q1 supplied to the MIX 107, and supplied to the complex filter/LPF 108.

The complex filter/LPF 108 is a filter that limits the signal band of the frequency-converted signal. The complex filter/LPF 108 functions as a complex filter that limits the frequency band of the IF in a case where the IF signal is supplied from the MIX 107, and functions as an LPF that limits the frequency band of the BB in a case where the first IF signal is supplied from the MIX 107.

The complex filter/LPF 108 includes a complex filter/LPF 121-1, a complex filter/LPF 121-2, and a switch 122.

In a case where the switch 122 is turned on, the complex filter/LPF 121-1 and the complex filter/LPF 121-2 function as a complex filter by sharing at least a part of signal paths for the IF(I) signal and the IF(Q) signal supplied from the MIX 107 and combining vectors of the signals. The complex filter/LPF 121-1 and the complex filter/LPF 121-2 limit the frequency bands of the IF(I) signal and the IF(Q) signal whose vectors are combined by sharing at least a part of the signal paths, and output the IF(I) signal and the IF(Q) signal, respectively.

In a case where the switch 122 is turned off, the complex filter/LPF 121-1 and the complex filter/LPF 121-2 do not share signal paths for the BB(I) signal and the BB(Q) signal supplied from the MIX 107, and each function as an LPF independently. The complex filter/LPF 121-1 and the complex filter/LPF 121-2 limit the frequency bands of the BB(I) signal and the BB(Q) signal and output the BB(I) signal and the BB(Q) signal, respectively.

Under the control of the control unit 24, the switch 122 is turned on in a case where the IF signal is supplied from the MIX 107, and is turned off in a case where the first IF signal is supplied from the MIX 107.

The IF(I) signal supplied from the complex filter/LPF 108 is output to the IQ combiner 110 via a terminal a of the switch 109. The IF(Q) signal supplied from the complex filter/LPF 108 is output to the IQ combiner 110 via a terminal a of the switch 111.

The IQ combiner 110 performs IQ combining of the IF(I) signal and the IF(Q) signal, generates an IF signal from which the image component has been removed, and outputs the IF signal to the IFVGA 112.

The BB(I) signal supplied from the complex filter/LPF 108 is output to the BBVGA 113 via a terminal b of the switch 109. The BB(Q) signal supplied from the complex filter/LPF 108 is output to the BBVGA 114 via a terminal b of the switch 111.

The IFVGA 112, the BBVGA 113, and the BBVGA 114 are VGAs whose amplification degree can be varied by a control voltage that changes according to the magnitude of the supplied signal level.

The IFVGA 112 amplifies the IF signal supplied from the IQ combiner 110 and outputs the amplified IF signal to the output terminal 115. The BBVGA 113 amplifies the BB(I) signal supplied via the switch 109 and outputs the amplified BB(I) signal to the output terminal 116. The BBVGA 114 amplifies the BB(Q) signal supplied via the switch 111 and outputs the amplified BB(Q) signal to the output terminal 117.

The output terminal 115 outputs the IF signal supplied from the IFVGA 112 to the ADC 41-1 of the demodulation unit 22 at the subsequent stage, which has been described above with reference to FIG. 1. The output terminal 116 outputs the BB(I) signal supplied from the BBVGA 113 to the ADC 41-2 of the demodulation unit 22 at the subsequent stage. The output terminal 117 outputs the BB(Q) signal supplied from the BBVGA 114 to the ADC 41-3 of the demodulation unit 22 at the subsequent stage.

At present, in order to reduce the cost of a demodulation LSI that performs the demodulation processing, it is considered that the number of the ADCs 41-1 to 41-3 each having a large layout size is decreased to two.

For example, in a case where one ADC 41-1 is shared by the input of the IF signal and the input of the BB(I) signal, it is necessary to provide a switch for switching the input inside or outside the tuner. In a case where the switch is provided outside the tuner, an increase in cost for the switch is predicted.

Meanwhile, a configuration of the tuner is also conceivable in which the BB(I) signal and the BB(Q) signal are also output for the terrestrial digital broadcasting as for the satellite digital broadcasting. However, in addition to the IC that outputs the terrestrial wave as the IF signal, a dedicated integrated circuit (IC) that outputs both the terrestrial wave and satellite wave as the BB(I) signal and the BB(Q) signal is required.

Therefore, a tuner of the present technology includes an IF output terminal configured to output an IF signal of terrestrial broadcasting, a first output terminal configured to output the IF signal or one of BB signals that are output signals of satellite digital broadcasting and have orthogonal phases, and a second output terminal configured to output another of the BB signals.

1. First Embodiment

Configuration of Broadcast Receiving System of Present Technology

Figure 3:
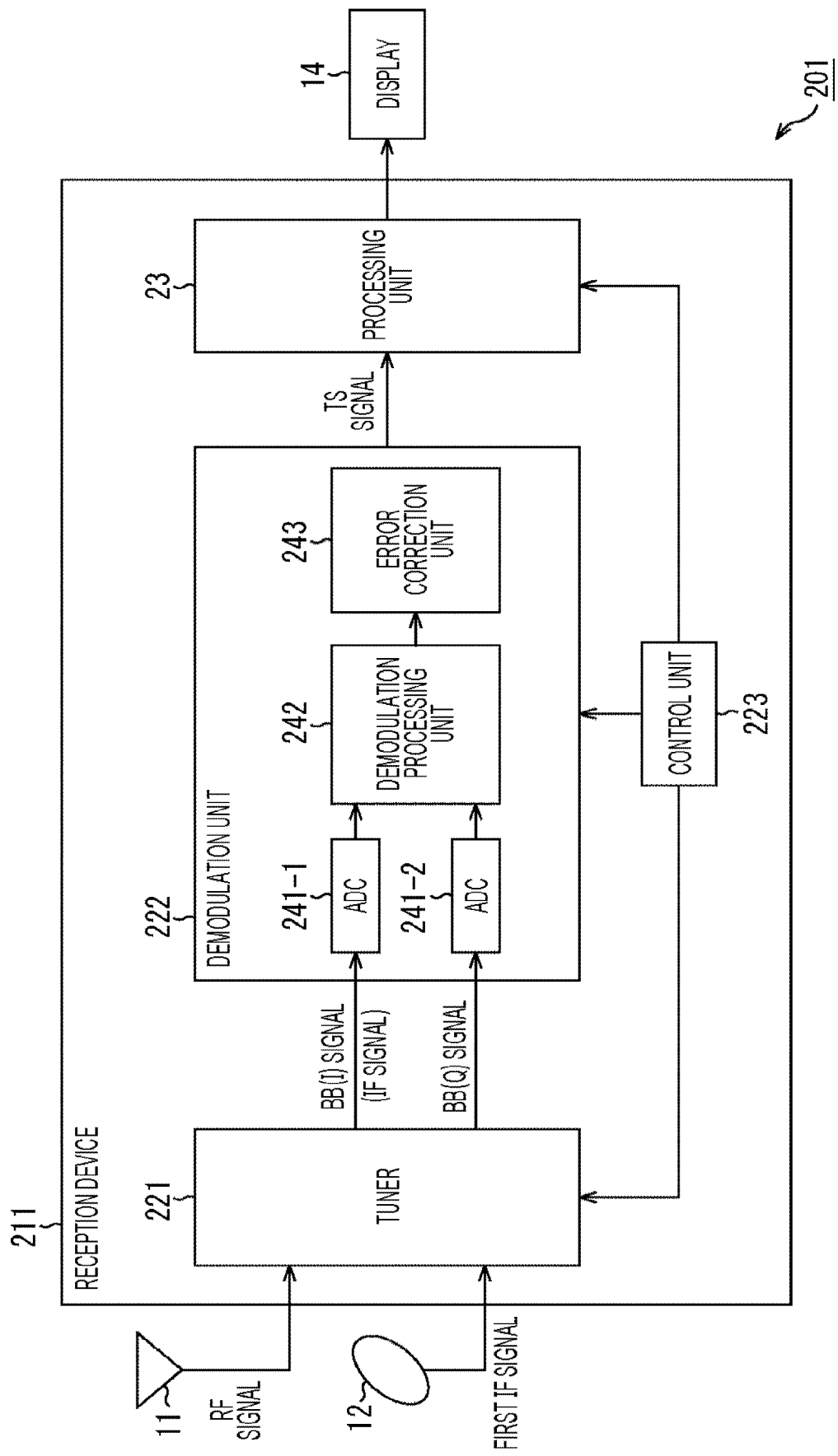
FIG. 3 is a block diagram illustrating a configuration example of a broadcast receiving system of the present technology.

FIG. 3 is a block diagram illustrating a configuration example of a broadcast receiving system of the present technology.

A broadcast receiving system 201 in FIG. 3 includes a terrestrial broadcasting antenna 11, a satellite digital broadcasting antenna 12, a reception device 211, and a display 14. In the configuration illustrated in FIG. 3, the same components as those described with reference to FIG. 1 are denoted by the same reference signs. Overlapping description will be omitted as appropriate.

The reception device 211 includes a tuner 221, a demodulation unit 222, a processing unit 23, and a control unit 223.

The tuner 221 includes one chip such as an IC. The tuner 221 selects the frequency of a channel desired by a user under the control of the control unit 223. The tuner 221 amplifies an RF signal of the selected frequency and converts the frequency of the RF signal into a low frequency.

At this time, the tuner 221 sets whether to output a signal of a broadcast wave as an IF signal or as a BB(I) signal and a BB(Q) signal.

In a case where the frequency of a channel of terrestrial broadcasting is selected, the tuner 221 sets whether to output an RF signal of the terrestrial broadcasting as the IF signal or as the BB(I) signal and the BB(Q) signal under the control of the control unit 223. Furthermore, the tuner 221 sets an output terminal from which the RF signal of the terrestrial broadcasting is output.

Furthermore, unlike the tuner 21 in FIG. 1, the tuner 221 includes an output terminal that outputs the IF signal, an output terminal that outputs the BB(I) signal or the IF signal, and an output terminal that outputs the BB(Q) signal. Under the control of the control unit 223, the tuner 221 uses an output terminal corresponding to the configuration of the demodulation unit 222 arranged at the subsequent stage among the three output terminals.

The demodulation unit 222 performs demodulation processing under the control of the control unit 223. The demodulation unit 222 includes ADCs 241-1 and 241-2, a demodulation processing unit 242, and an error correction unit 243.

The ADCs 241-1 and 241-2 convert the IF signal, the BB (I) signal, and the BB (Q) signal, which are analog signals supplied from the tuner 221, into digital signals. The ADC 241-1 converts the IF signal or the BB (I) signal into a digital signal, and outputs the converted digital signal to the demodulation processing unit 242. The ADC 241-2 converts the BB (Q) signal into a digital signal, and outputs the converted digital signal to the demodulation processing unit 242.

The demodulation processing unit 242 is basically configured similarly to the demodulation processing unit 42-2 in FIG. 1. The error correction unit 243 is basically configured similarly to the error correction unit 43-2 in FIG. 1.

At the time of channel selection, the control unit 223 performs "control for switching between terrestrial broadcasting and satellite broadcasting", "control for switching between IF and IQ", "control for switching the terrestrial wave output destination", and "control for switching between terrestrial IF and terrestrial IQ" on the tuner 221.

The "control for switching between terrestrial broadcasting and satellite broadcasting" is control for setting a channel to be viewed from a terrestrial broadcasting channel and a satellite broadcasting channel. The "control for switching between IF and IQ" is control for setting whether to output the signal as the IF signal or as IQ signals. The IQ signals are BB(IQ) signals, and are a combination of a BB(I) signal and a BB(Q) signal.

The "control for switching the terrestrial wave output destination" is control for setting whether an output destination of the IF signal of the terrestrial broadcasting is the output terminal that outputs the IF signal or the output terminal that outputs the BB(I) signal. The "control for switching between terrestrial IF and terrestrial IQ" is control for setting whether to output the RF signal of the terrestrial broadcasting as the IF signal or as the BB(I) signal and the BB(Q) signal.

As described above, in the broadcast receiving system 201, the tuner 221 includes the output terminal that outputs the BB(I) signal or the IF signal, and thus the demodulation unit 222 can be configured by two ADCs. As a result, the cost of the demodulation unit 222 can be reduced.

Note that, although FIG. 3 illustrates an example in which the tuner 221 includes the output terminal that outputs the BB(I) signal or the IF signal, it is sufficient that one of the terminals that output the BB(I) signal or the BB(Q) signal corresponds to the output of the IF signal. The tuner 221 may be configured such that the output terminal from which the tuner 221 outputs the BB(Q) signal can output the IF signal.

Configuration Example of Tuner

Figure 4:
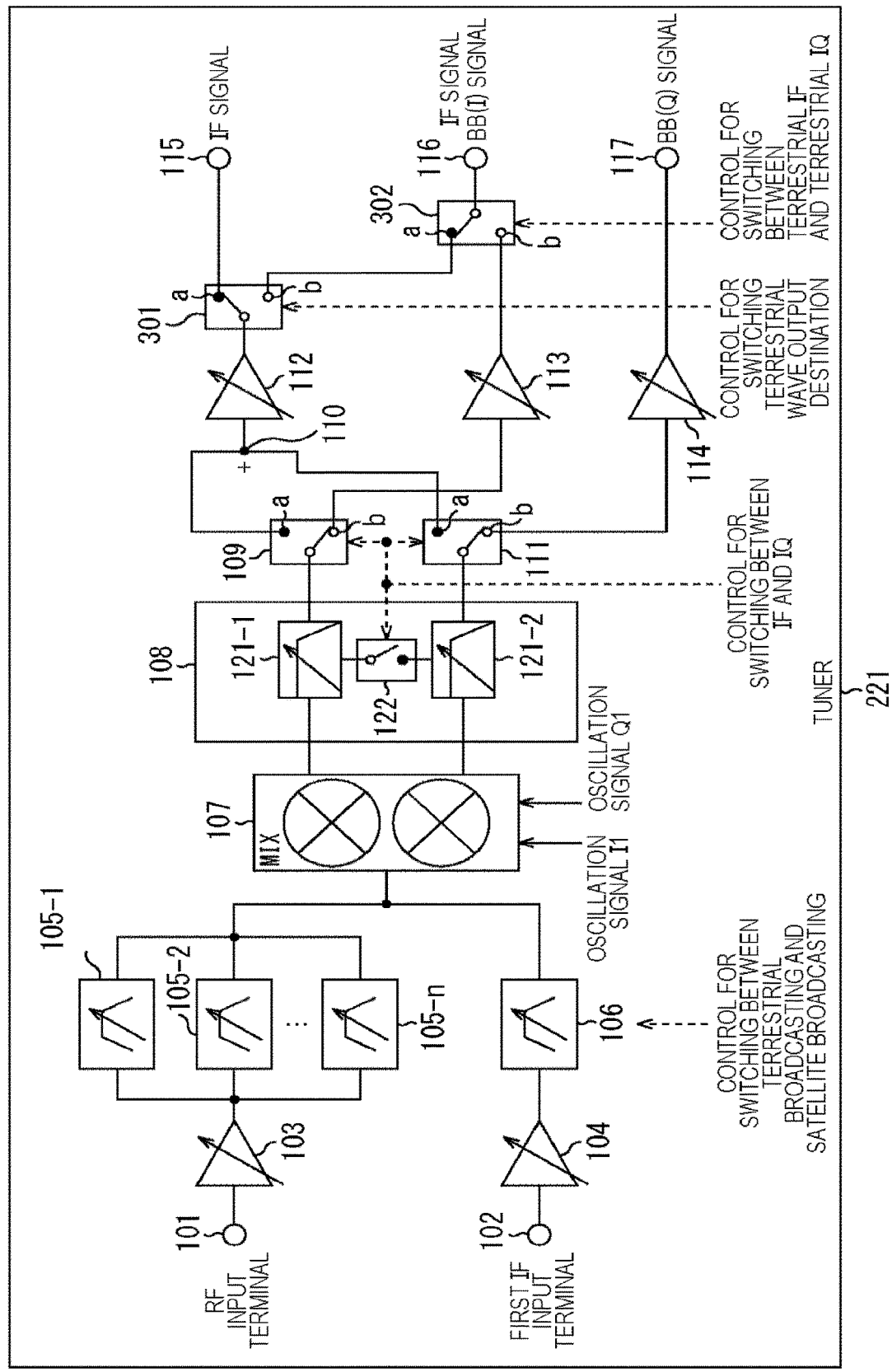
FIG. 4 is a diagram illustrating a configuration example of a tuner in FIG. 3.

FIG. 4 is a diagram illustrating a configuration example of the tuner 221.

The tuner 221 in FIG. 4 is different from the tuner 21 in FIG. 2 in that switches 301 and 302 are added. In the configuration illustrated in FIG. 4, the same components as those described with reference to FIG. 2 are denoted by the same reference signs. Overlapping description will be omitted as appropriate.

Furthermore, the tuner 221 is provided with four control lines each of which is set to Low (L) or High (H) under the control of the control unit 223 at the time of channel selection. The four control lines are control lines for the four types of control in the control unit 223 described above. The four control lines are a control line for the "control for switching between terrestrial broadcasting and satellite broadcasting", a control line for the "control for switching between IF and IQ", a control line for the "control for switching the terrestrial wave output destination", and a control line for the "control for switching between terrestrial IF and terrestrial IQ".

The control line for the "control for switching between terrestrial broadcasting and satellite broadcasting" is connected to an RF filter 105 and an RF filter 106.

In a case where the control line for the "control for switching between terrestrial broadcasting and satellite broadcasting" is set to L, the RF filter 105 filters the frequency of the RF signal supplied from an RFVGA 103. In a case where the control line for the "control for switching between terrestrial broadcasting and satellite broadcasting" is set to H, the RF filter 106 filters the frequency of the first IF signal supplied from an RFVGA 104.

The control line for the "switching between IF and IQ" is connected to a switch 122 of a complex filter/LPF 108 and switches 109 and 111. The switches 122, 109, and 111 are configured to synchronize.

In a case where the control line for the "switching between IF and IQ" is set to L, the complex filter/LPF 108 functions as a complex filter and outputs an IF(I) signal and an IF(Q) signal. In a case where the control line for the "switching between IF and IQ" is set to H, the complex filter/LPF 108 functions as an LPF and outputs the BB(I) signal and the BB(Q) signal.

In a case where the control line for the "switching between IF and IQ" is set to L, the switches 109 and 111 respectively output the IF(I) signal and the IF(Q) signal supplied from the complex filter/LPF 108 to terminals a. In a case where the control line for the "switching between IF and IQ" is set to H, the switches 109 and 111 respectively output the BB(I) signal and the BB(Q) signal supplied from the complex filter/LPF 108 to terminals b.

The control line for the "switching the terrestrial wave output destination" is connected to the switch 301 arranged at the subsequent stage of an IFVGA 112.

In a case where the control line for the "switching the terrestrial wave output destination" is set to L, the switch 301 selects a terminal a and outputs the IF signal supplied from the IFVGA 112 to an output terminal 115. In a case where the control line for the "switching the terrestrial wave output destination" is set to H, the switch 301 selects a terminal b and outputs the IF signal supplied from the IFVGA 112 to an output terminal 116.

The control line for the "switching between terrestrial IF and terrestrial IQ" is connected to the switch 301 and the switch 302 arranged at the subsequent stage of a BBVGA 113.

In a case where the control line for the "switching between terrestrial IF and terrestrial IQ" is set to L, the switch 302 selects a terminal a and outputs the IF signal supplied from the switch 301 to the output terminal 116. In a case where the control line for the "switching between terrestrial IF and terrestrial IQ" is set to H, the switch 302 selects a terminal b and outputs the BB(I) signal supplied from the BBVGA 113 to the output terminal 116.

The tuner 221 in FIG. 4 includes the output terminal 116 that outputs the IF signal or the BB(I) signal. However, while the BB(I) signal supplied from the BBVGA 113 is output to the output terminal 116 via the switch 302, the BB(Q) signal supplied from a BBVGA 114 is directly output to an output terminal 117 without passing through a switch.

In the case of such a configuration in FIG. 4, it is possible to output the BB(I) signal or the IF signal from the output terminal 116, but a balance between the BB(I) signal and the BB(Q) signal may be deteriorated, and characteristics may be deteriorated.

Furthermore, when the user selects a channel, the control unit 223 controls settings of the "control for switching between terrestrial broadcasting and satellite broadcasting", the "control for switching between IF and IQ", the "control for switching the terrestrial wave output destination", and the "switching between terrestrial IF and terrestrial IQ". Therefore, the control is complicated.

Control at the Time of Channel Selection

FIG. 5 is a diagram illustrating values of the control lines set at the time of channel selection.

In the case of the IF output of a terrestrial wave, the control line for the "control for switching between terrestrial broadcasting and satellite broadcasting" is set to L, the control line for the "control for switching between IF and IQ" is set to L, and the control line for the "control for switching the terrestrial wave output destination" is set to L. Note that, in the case of the IF output of the terrestrial wave, the control line for the "control for switching between terrestrial IF and terrestrial IQ" is not set.

In a case where the IF signal of the terrestrial wave is output to the output terminal of the BB(I) signal, the control line for the "control for switching between terrestrial broadcasting and satellite broadcasting" is set to L, and the control line for the "control for switching between IF and IQ" is set to L. In addition, in a case where the IF signal of the terrestrial wave is output to the output terminal of the BB(I) signal, the control line for the "switching the terrestrial wave output destination" is set to H, and the control line for the "control for switching between terrestrial IF and terrestrial IQ" is set to L.

In the case of the IQ output of the terrestrial wave, the control line for the "control for switching between terrestrial broadcasting and satellite broadcasting" is set to L, the control line for the "switching between IF and IQ" is set to H, and the control line for the "switching between terrestrial IF and terrestrial IQ" is set to H. Note that, in the case of the IQ output of the terrestrial wave, the control line for the "switching the terrestrial wave output destination" is not set.

In the case of the output of a satellite wave, the control line for the "control for switching between terrestrial broadcasting and satellite broadcasting" is set to H, the control line for the "switching between IF and IQ" is set to H, and the control line for the "switching between terrestrial IF and terrestrial IQ" is set to H. Note that, in the case of satellite output, the control line for the "switching the terrestrial wave output destination" is not set.

As described above, at the time of channel selection, combination of L and H is different for each output method of the terrestrial wave, as shown in the case of outputting the IF signal of the terrestrial wave to the output terminal of the BB(I) signal and in the case of the IQ output of the terrestrial wave, and thus, the control at the time of channel selection is complicated.

Therefore, in a second embodiment of the present technology to be described next, the tuner is provided with a control circuit for initially setting other types of control than the switching between terrestrial broadcasting and satellite broadcasting, so that only controlling the switching between terrestrial broadcasting and satellite broadcasting at the time of channel selection makes it possible to switch predetermined switches. This configuration facilitates the control at the time of channel selection.

Furthermore, a dummy switch is provided at the preceding stage of the output terminal that does not concurrently use the output of the IF signal. As a result, signal paths for the BB(I) signal and the BB(Q) signal are the same, the amplitude levels of the respective signals and the phases of the signals are maintained to be the same, and deterioration of the characteristics of the BB signals is prevented.

2. Second Embodiment

Configuration Example of Tuner

Figure 6:
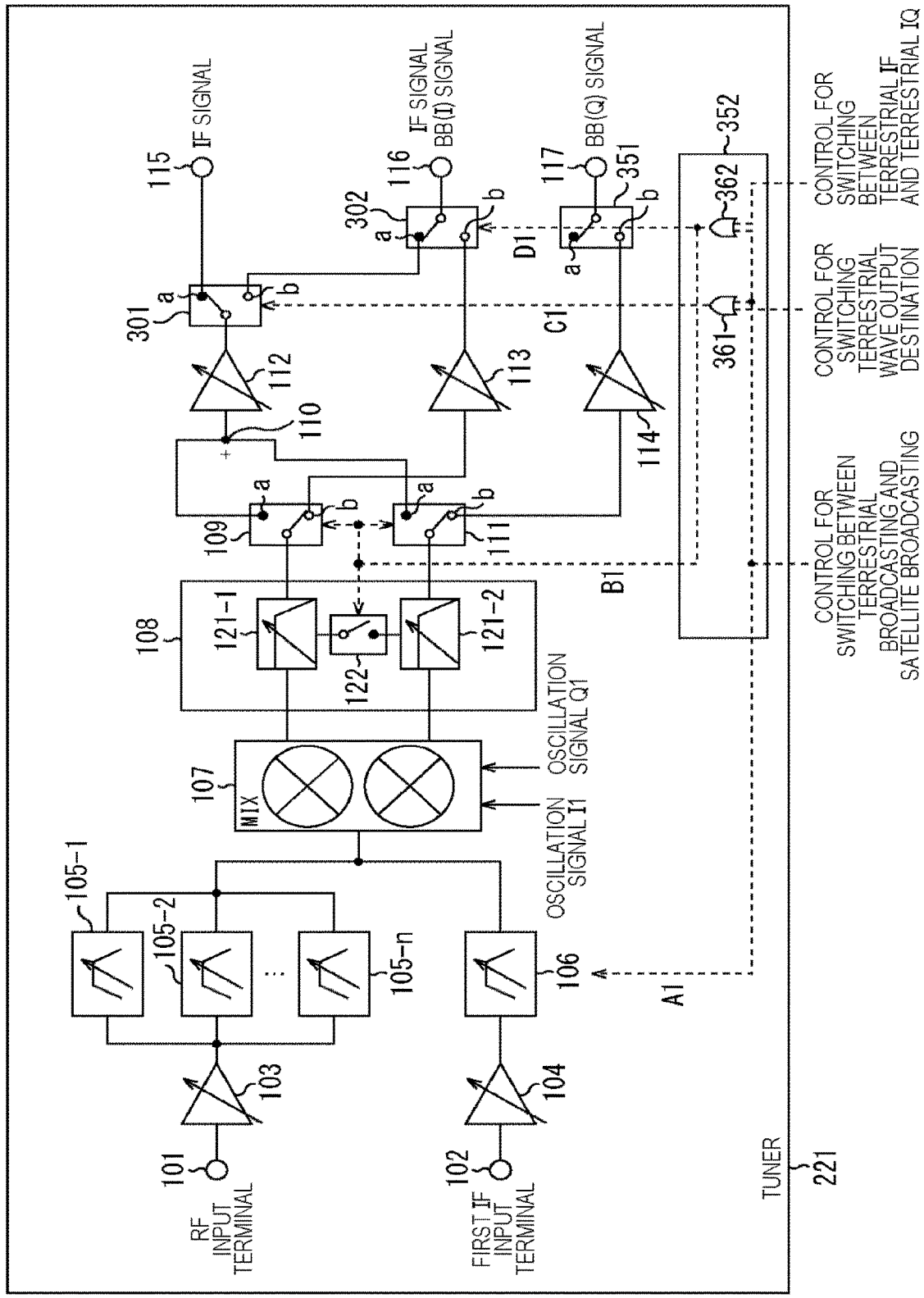
FIG. 6 is a diagram illustrating another configuration example of the tuner in FIG. 3.

FIG. 6 is a diagram illustrating another configuration example of the tuner 221.

The tuner 221 in FIG. 6 is different from the tuner 221 in FIG. 4 in that a dummy switch 351 arranged at the subsequent stage of the BBVGA 114 and a control circuit 352 are added. In the configuration illustrated in FIG. 6, the same components as those described with reference to FIGS. 2 and 4 are denoted by the same reference signs. Overlapping description will be omitted as appropriate.

Furthermore, in the tuner 221 in FIG. 6, three control lines are connected to the control circuit 352 from a control unit 323, and internal control lines A1 to D1 are each connected from the control circuit 352 to a predetermined circuit or a predetermined switch.

The control circuit 352 includes an OR circuit 361 and an OR circuit 362. The internal control line A1 is connected from the control circuit 352 to the RF filter 105 and the RF filter 106. The internal control line B1 is connected from the OR circuit 362 of the control circuit 352 to the switches 122, 109, and 111. The internal control line C1 is connected from the OR circuit 361 of the control circuit 352 to the switch 301. The internal control line D1 is connected from the OR circuit 362 of the control circuit 352 to the switch 302 and the dummy switch 351.

In the tuner 221 in FIG. 6, as illustrated in FIG. 7, the values of the "control for switching the terrestrial wave output destination" and the "control for switching between terrestrial IF and terrestrial IQ" are set in advance at the time of initial setting, such as at the time of installation or power activation. That is, in the tuner 221, only the value of the "control for switching between terrestrial broadcasting and satellite broadcasting" is set at the time of channel selection. Note that FIG. 7 will be appropriately referred to for describing setting of each type of control.

FIG. 7 is a diagram illustrating values set for each type of control and each internal control line in FIG. 6.

As illustrated in FIG. 7, the "control for switching between terrestrial broadcasting and satellite broadcasting" is set to L in the case of the terrestrial wave, and is set to H in the case of the satellite wave.

The "control for switching the terrestrial wave output destination" is set to L in advance in a case where the output destination is the output terminal 115, and is set to H in advance in a case where the output destination is the output terminal 116. The "control for switching between terrestrial IF and terrestrial IQ" is set to L in advance in the case of the IF output, and is set to H in advance in the case of the IQ output.

The values set in advance for the "control for switching the terrestrial wave output destination" and the "control for switching between terrestrial IF and terrestrial IQ" and the value set for the "control for switching between terrestrial broadcasting and satellite broadcasting" when the user selects a channel are supplied to the control circuit 352.

As illustrated in FIG. 7, the "control for switching between terrestrial broadcasting and satellite broadcasting" is set to L in the case of the terrestrial wave, and is set to H in the case of the satellite wave. Therefore, the internal control line A1 is set to L in the case of the terrestrial wave, and is set to H in the case of the satellite wave.

The value set in advance for the "control for switching the terrestrial wave output destination" and the value set for the "control for switching between terrestrial broadcasting and satellite broadcasting" are supplied to the OR circuit 361. In the OR circuit 361, the internal control line C1 is set according to a result of an OR operation of the value set in advance for the "control for switching the terrestrial wave output destination" and the value set for the "control for switching between terrestrial broadcasting and satellite broadcasting" when the user selects a channel.

Therefore, as illustrated in FIG. 7, the internal control line C1 is set to L in a case where the terrestrial wave is received and the output destination of the IF signal is the output terminal 115, and is set to H in a case where the terrestrial wave is received and the output destination of the IF signal is the output terminal 116. In addition, the internal control line C1 is set to H in the case of the satellite wave. Note that, in a case where the terrestrial wave is received and the IQ signals are output, the internal control line C1 is not set.

The value set in advance for the "control for switching between terrestrial IF and terrestrial IQ" and the value set for the "control for switching between terrestrial broadcasting and satellite broadcasting" are supplied to the OR circuit 362. In the OR circuit 362, values of the internal control lines B1 and D1 are set according to a result of an OR operation of the value set in advance for the "control for switching between terrestrial IF and terrestrial IQ" and the value set for the "control for switching between terrestrial broadcasting and satellite broadcasting" when the user selects a channel.

Therefore, the internal control lines B1 and D1 are set to L in a case where the terrestrial wave is received and the IF signal is output, are set to H in a case where the terrestrial wave is received and the IQ signals are output, and are set to H in a case where the satellite wave is received.

The internal control line A1 described above is connected to the RF filter 105 and the RF filter 106.

In a case where the internal control line A1 is set to L, the RF filter 105 filters the frequency of the RF signal supplied from the RFVGA 103. In a case where the internal control line A1 is set to H, the RF filter 106 filters the frequency of the first IF signal supplied from the RFVGA 104.

The internal control line B1 is connected to the switch 122 of the complex filter/LPF 108 and the switches 109 and 111.

In a case where the internal control line B1 is set to L, the complex filter/LPF 108 turns on the switch 122 to share a part of the signal paths, functions as a complex filter, and outputs the IF (I) signal and the IF (Q) signal. In a case where the internal control line B1 is set to H, the complex filter/LPF 108 turns off the switch 122, functions as an LPF without sharing the signal paths, and outputs the BB (I) signal and the BB (Q) signal.

In a case where the internal control line B1 is set to L, the switches 109 and 111 respectively output the IF(I) signal and the IF(Q) signal supplied from the complex filter/LPF 108 to the terminals a. In a case where the internal control line B1 is set to H, the switches 109 and 111 respectively output the BB(I) signal and the BB(Q) signal supplied from the complex filter/LPF 108 to the terminals b.

The internal control line C1 is connected to the switch 301 arranged at the subsequent stage of the IFVGA 112.

In a case where the internal control line C1 is set to L, the switch 301 selects the terminal a and outputs the IF signal supplied from the IFVGA 112 to the output terminal 115. In a case where the internal control line C1 is set to H, the switch 301 selects the terminal b and outputs the IF signal supplied from the IFVGA 112 to the output terminal 116.

The internal control line D1 is connected to the switch 302 and the dummy switch 351.

In a case where the internal control line D1 is set to L, the switch 302 selects the terminal a and outputs the IF signal supplied from the switch 301 to the output terminal 116. In a case where the internal control line D1 is set to H, the switch 302 selects the terminal b and outputs the BB(I) signal supplied from the BBVGA 113 to the output terminal 116.

In a case where the internal control line D1 is set to L, the dummy switch 351 selects a terminal a. In a case where the internal control line D1 is set to H, the dummy switch 351 selects a terminal b and outputs the BB(Q) signal supplied from the BBVGA 114 to the output terminal 117.

Example 1 of Signal Flow in Tuner

Figure 8:
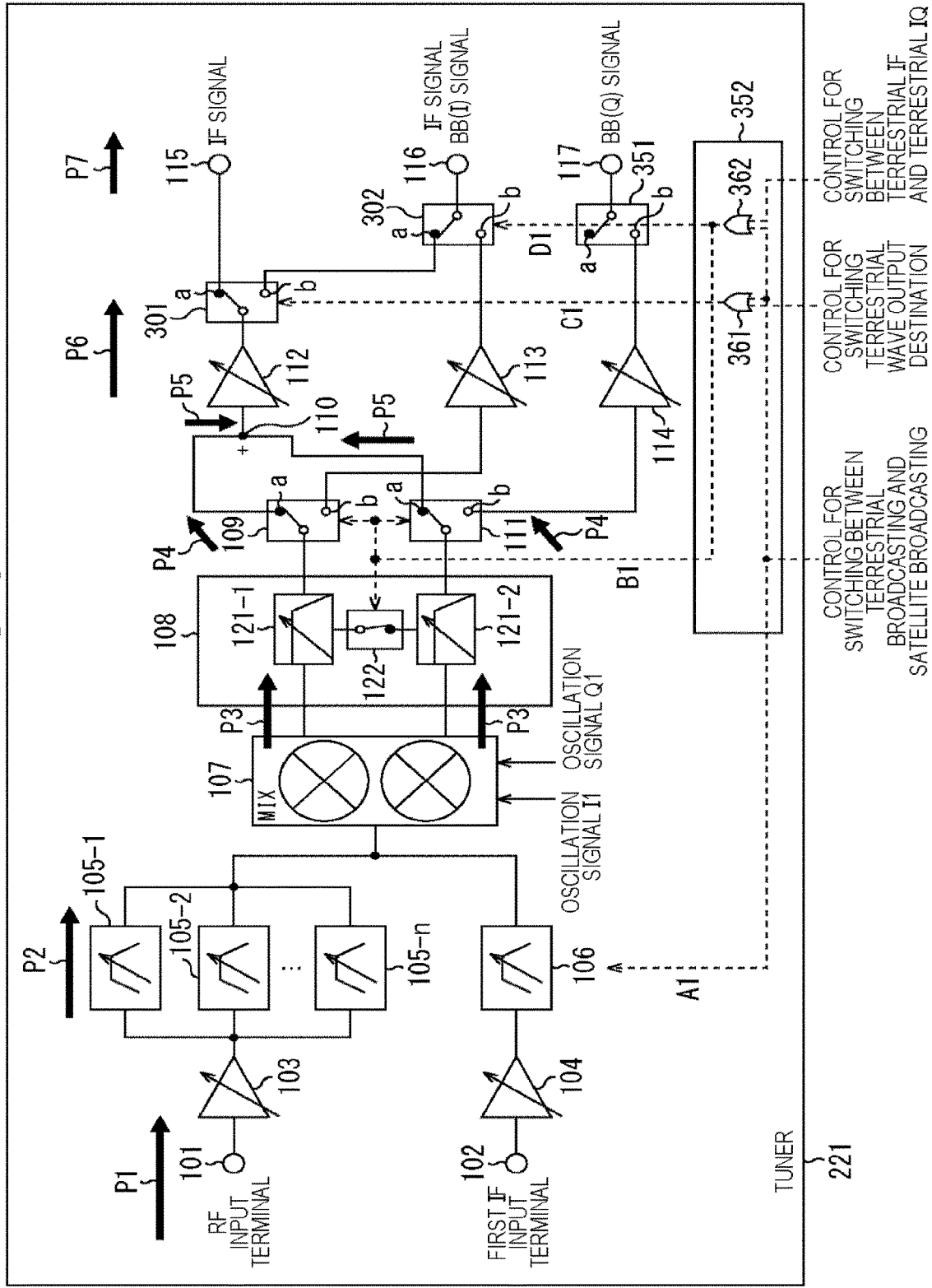
FIG. 8 is a diagram illustrating a signal flow in the tuner in a case where an output destination of an IF signal of a terrestrial wave is an output terminal 115.

FIG. 8 is a diagram illustrating a signal flow in the tuner in a case where the output destination of the IF signal of the terrestrial wave is the output terminal 115.

In FIG. 8, an arrow with an alphabet indicates the signal flow. The same applies to the following drawings.

In a case where the output destination of the IF signal of the terrestrial wave is the output terminal 115, the control unit 223 sets the "control for switching the terrestrial wave output destination" to L and sets the "control for switching between terrestrial IF and terrestrial IQ" to L at the time of initial setting. Furthermore, at the time of channel selection, the control unit 223 sets the "control for switching between terrestrial broadcasting and satellite broadcasting" to L.

As indicated by an arrow P1, an RF input terminal 101 receives the RF signal, which is a terrestrial broadcast signal supplied from the terrestrial broadcasting antenna 11, and outputs the RF signal to the RFVGA 103. The RFVGA 103 amplifies the RF signal supplied from the RF input terminal 101. The RF signal is supplied to an RF filter of a frequency band corresponding to the frequency of a selected channel among the RF filters 105.

At this time, since the "control for switching between terrestrial broadcasting and satellite broadcasting" is set to L and the internal control line A1 is set to L, the RF filter 105 filters the frequency of the RF signal supplied from the RFVGA 103 as indicated by an arrow P2. The RF signal filtered by the RF filter 105 is output to a MIX 107.

As indicated arrows P3, the MIX 107 frequency-converts the RF signal into the IF(I) signal and the IF(Q) signal by an oscillation signal I1 and an oscillation signal Q1 supplied to the MIX 107, and outputs the IF(I) signal and the IF(Q) signal to the complex filter/LPF 108.

Since the "control for switching between terrestrial broadcasting and satellite broadcasting" is set to L and the "control for switching between terrestrial IF and terrestrial IQ" is set to L, the OR circuit 362 sets each of the internal control line B1 and the internal control line D1 to L.

Since the internal control line B1 is set to L, the complex filter/LPF 108 turns on the switch 122 to share a part of the signal paths, functions as a complex filter, and outputs the IF(I) signal and the IF(Q) signal.

In addition, since the internal control line B1 is set to L, the switches 109 and 111 respectively output the IF(I) signal and the IF(Q) signal supplied from the complex filter/LPF 108 to the terminals a as indicated by arrows P4.

As indicated by arrows P5, an IQ combiner 110 performs IQ combining of the IF(I) signal and the IF(Q) signal, generates the IF signal from which an image component has been removed, and outputs the IF signal to the IFVGA 112.

As indicated by an arrow P6, the IFVGA 112 amplifies the IF signal supplied from the IQ combiner 110 and outputs the amplified IF signal to the switch 301.

Since the "control for switching between terrestrial broadcasting and satellite broadcasting" is set to L and the "control for switching the terrestrial wave output destination" is set to L, the OR circuit 361 sets the internal control line C1 to L.

Since the internal control line C1 is set to L, the switch 301 selects the terminal a and outputs the IF signal supplied from the IFVGA 112 to the output terminal 115.

Note that, in this case, although not directly related to the signal flow, the internal control line D1 is set to L, and thus the switch 302 selects the terminal a and the dummy switch 351 selects the terminal a.

Example 2 of Signal Flow in Tuner

Figure 9:
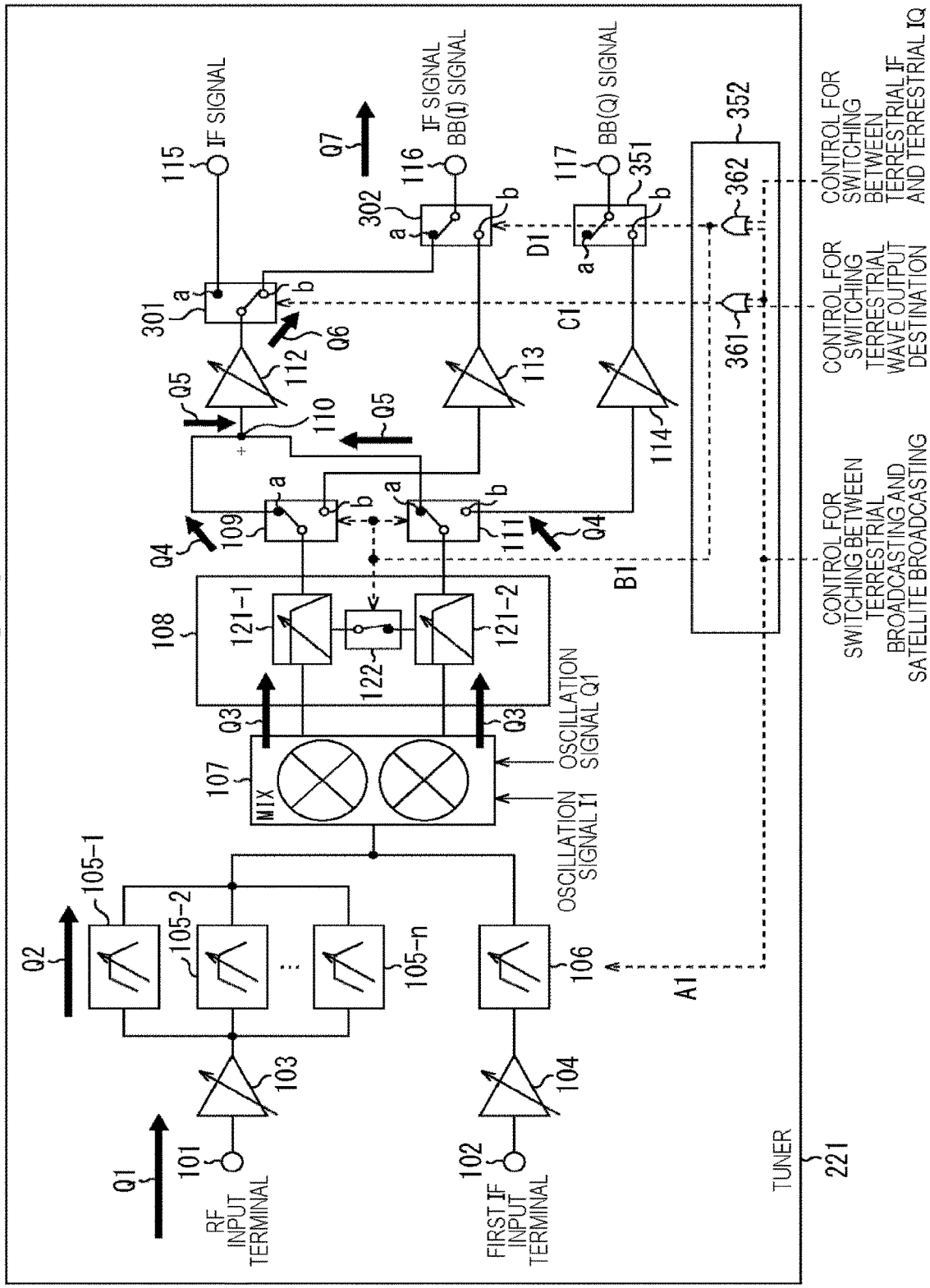
FIG. 9 is a diagram illustrating a signal flow in the tuner in a case where the output destination of the IF signal of the terrestrial wave is an output terminal 116.

FIG. 9 is a diagram illustrating a signal flow in the tuner in a case where the output destination of the IF signal of the terrestrial wave is the output terminal 116 that outputs the BB(I) signal.

In a case where the output destination of the IF signal of the terrestrial wave is the output terminal 116, the control unit 223 sets the "control for switching the terrestrial wave output destination" to H and sets the "control for switching between terrestrial IF and terrestrial IQ" to L at the time of initial setting. Furthermore, at the time of channel selection, the control unit 223 sets the "control for switching between terrestrial broadcasting and satellite broadcasting" to L.

Note that the signal flow indicated by arrows Q1 to Q5 in FIG. 9 are basically similar to the signal flow indicated by the arrows P1 to P5 in FIG. 8, and thus description thereof will be omitted.

As indicated by the arrows Q5, the IQ combiner 110 performs IQ combining of the IF (I) signal and the IF (Q) signal, generates the IF signal from which the image component has been removed, and outputs the IF signal to the IFVGA 112.

As indicated by an arrow Q6, the IFVGA 112 amplifies the IF signal supplied from the IQ combiner 110 and outputs the amplified IF signal to the switch 301.

Since the "control for switching between terrestrial broadcasting and satellite broadcasting" is set to L and the "control for switching the terrestrial wave output destination" is set to H, the OR circuit 361 sets the internal control line C1 to H.

Since the internal control line C1 is set to H, the switch 301 selects the terminal b and outputs the IF signal supplied from the IFVGA 112 to the switch 302.

Since the internal control line D1 is set to L, the switch 302 selects the terminal a and outputs the IF signal supplied from the switch 301 to the output terminal 116. Note that, at this time, the dummy switch 351 selects the terminal a.

Example 3 of Signal Flow in Tuner

Figure 10:
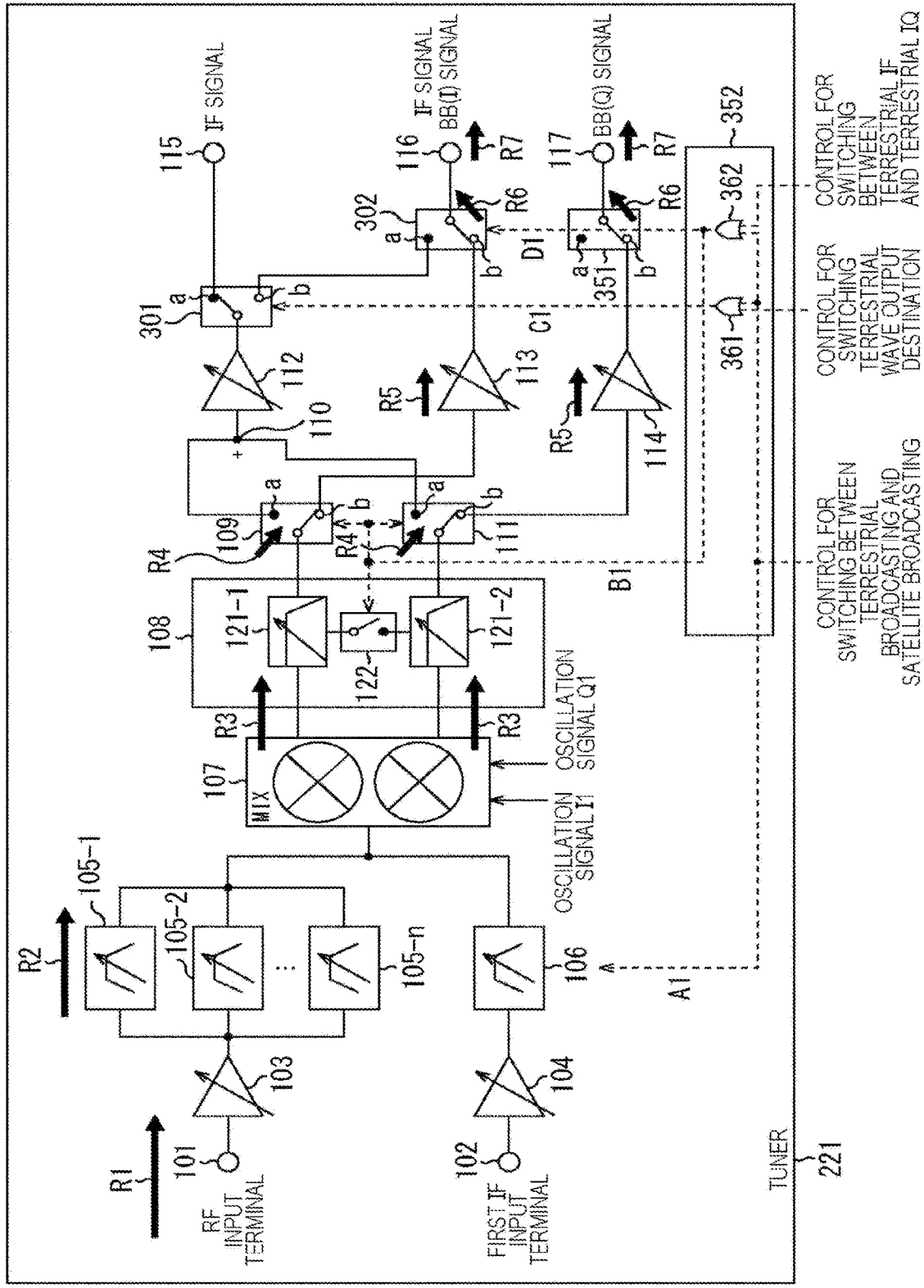
FIG. 10 is a diagram illustrating a signal flow in the tuner in a case where the terrestrial wave is output as IQ signals.

FIG. 10 is a diagram illustrating a signal flow in the tuner in a case where the terrestrial wave is output as the IQ signals.

In a case where the terrestrial wave is output as the IQ signals, the control unit 223 sets the "control for switching the terrestrial wave output destination" to L and sets the "control for switching between terrestrial IF and terrestrial IQ" to H at the time of initial setting. Furthermore, at the time of channel selection, the control unit 223 sets the "control for switching between terrestrial broadcasting and satellite broadcasting" to L.

Note that the signal flow indicated by arrows R1 and R2 in FIG. 10 are basically similar to the signal flow indicated by the arrows P1 and P2 in FIG. 8, and thus description thereof will be omitted.

As indicated by arrows R3, the MIX 107 frequency-converts the RF signal into the BB(I) signal and the BB(Q) signal by the oscillation signal I1 and the oscillation signal Q1 supplied to the MIX 107, and outputs the BB(I) signal and the BB(Q) signal to the complex filter/LPF 108.

Since the "control for switching between terrestrial broadcasting and satellite broadcasting" is set to L and the "control for switching between terrestrial IF and terrestrial IQ" is set to H, the OR circuit 362 sets each of the internal control line B1 and the internal control line D1 to H.

Since the internal control line B1 is set to H, the complex filter/LPF 108 turns off the switch 122, functions as an LPF without sharing the signal paths, and outputs the BB(I) signal and the BB(Q) signal.

In addition, since the internal control line B1 is set to H, the switches 109 and 111 respectively output the BB(I) signal and the BB(Q) signal supplied from the complex filter/LPF 108 to the terminals b, as indicated by arrows R4.

As indicated by one of arrows R5, the BBVGA 113 amplifies the BB(I) signal supplied from the switch 109 and outputs the amplified BB(I) signal to the switch 302.

As indicated by one of the arrows R5, the BBVGA 114 amplifies the BB(Q) signal supplied from the switch 111 and outputs the amplified BB(Q) signal to the dummy switch 351.

Since the internal control line D1 is set to H, the switch 302 selects the terminal b and outputs the BB(I) signal supplied from the BBVGA 113 to the output terminal 116.

Since the internal control line D1 is set to H, the dummy switch 351 selects the terminal b and outputs the BB(Q) signal supplied from the BBVGA 114 to the output terminal 117.

Example 4 of Signal Flow in Tuner

Figure 11:
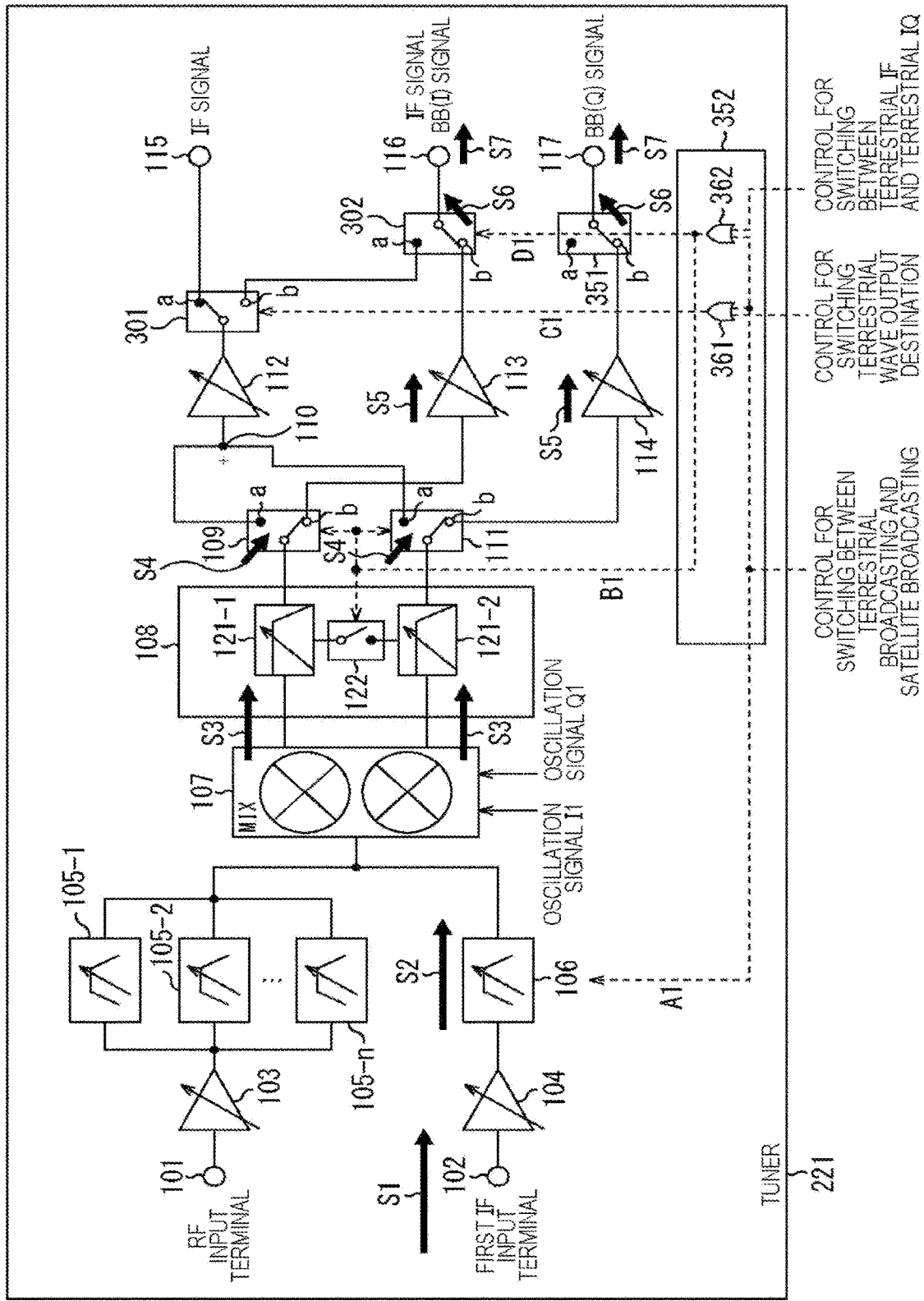
FIG. 11 is a diagram illustrating a signal flow in the tuner in a case where a satellite wave is output as the IQ signals.

FIG. 11 is a diagram illustrating a signal flow in the tuner in a case where the satellite wave is output as the IQ signals.

In the case of FIG. 11, the "control for switching the terrestrial wave output destination" and the "control for switching between terrestrial IF and terrestrial IQ" are not particularly set at the time of initial setting. At the time of channel selection, the control unit 223 sets the "control for switching between terrestrial broadcasting and satellite broadcasting" to H.

As indicated by an arrow S1, a first IF input terminal 102 receives the first IF signal supplied from the satellite digital broadcasting antenna 12, which is a signal obtained by frequency conversion on the RF signal as a satellite digital broadcast signal, and outputs the first IF signal to the RFVGA 104. The RFVGA 104 amplifies the first IF signal supplied from the first IF input terminal 102. The first IF signal is supplied to the RF filter 106.

At this time, since the "control for switching between terrestrial broadcasting and satellite broadcasting" is set to H and the internal control line A1 is set to H, the RF filter 106 filters the frequency of the first IF signal supplied from the RFVGA 104, as indicated by an arrow S2. The first IF signal filtered by the RF filter 106 is output to the MIX 107.

As indicated by arrows S3, the MIX 107 frequency-converts the first IF signal into the BB(I) signal and the BB(Q) signal by the oscillation signal I1 and the oscillation signal Q1 supplied to the MIX 107, and outputs the BB(I) signal and the BB(Q) signal to the complex filter/LPF 108.

Since the "control for switching between terrestrial broadcasting and satellite broadcasting" is set to H, the OR circuit 362 sets each of the internal control line B1 and the internal control line D1 to H regardless of whether the "control for switching between terrestrial IF and terrestrial IQ" is set to H or L.

Since the internal control line B1 is set to H, the complex filter/LPF 108 turns off the switch 122, functions as an LPF without sharing the signal paths, and outputs the BB(I) signal and the BB(Q) signal.

In addition, since the internal control line B1 is set to H, the switches 109 and 111 respectively output the BB(I) signal and the BB(Q) signal supplied from the complex filter/LPF 108 to the terminals b, as indicated by arrows S4.

As indicated by one of arrows S5, the BBVGA 113 amplifies the BB(I) signal supplied from the switch 109 and outputs the amplified BB(I) signal to the switch 302.

As indicated by one of the arrows S5, the BBVGA 114 amplifies the BB(Q) signal supplied from the switch 111 and outputs the amplified BB(Q) signal to the dummy switch 351.

Since the internal control line D1 is set to H, the switch 302 selects the terminal b and outputs the BB(I) signal supplied from the BBVGA 113 to the output terminal 116.

Since the internal control line D1 is set to H, the dummy switch 351 selects the terminal b and outputs the BB(Q) signal supplied from the BBVGA 114 to the output terminal 117.

As described above, according to the second embodiment of the present technology, the IF signal is output from one of the terminals that output the BB(I) signal or the BB(Q) signal, and thus the number of ADCs at the subsequent stage can be reduced. As a result, the cost of a demodulation LSI can be easily reduced.

Note that, in the case of the reception device in FIG. 3, the IF signal can be output from one of the terminals that output the BB(I) signal or the BB(Q) signal. However, which of the ADCs can process the IF signal depends on the configuration of the demodulation processing unit, and thus it is desirable that the IF signal can be output from both the terminals that output the BB(I) signal or the BB(Q) signal.

3. Third Embodiment

Configuration of Broadcast Receiving System of Present Technology

Figure 12:
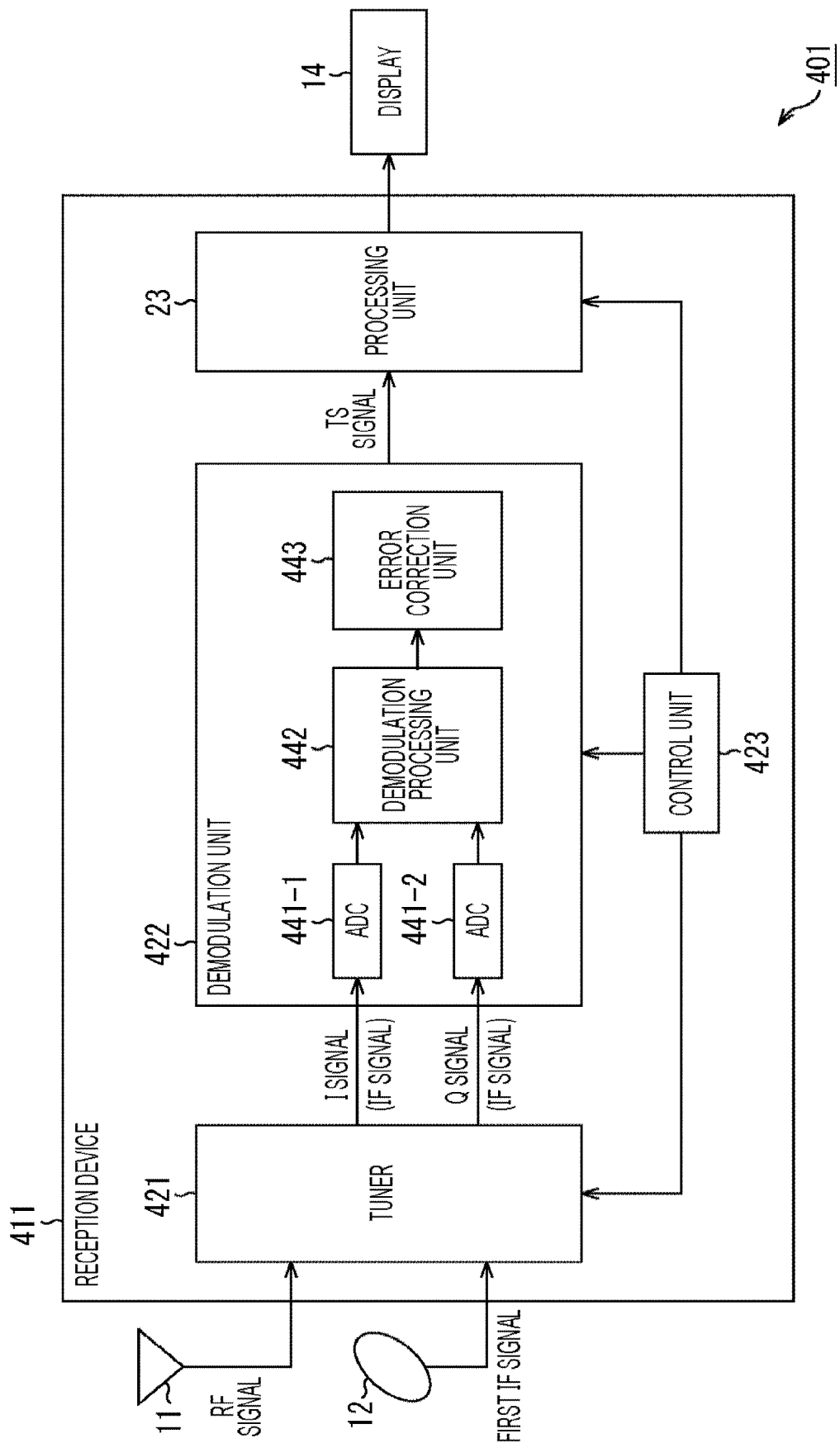
FIG. 12 is a block diagram illustrating a configuration example of a broadcast receiving system of the present technology.

FIG. 12 is a block diagram illustrating a configuration example of a broadcast receiving system of the present technology.

A broadcast receiving system 401 in FIG. 12 includes the terrestrial broadcasting antenna 11, the satellite digital broadcasting antenna 12, a reception device 411, and the display 14. In the configuration illustrated in FIG. 12, the same components as those described with reference to FIG. 1 or 3 are denoted by the same reference signs. Overlapping description will be omitted as appropriate.

The reception device 411 includes a tuner 421, a demodulation unit 422, the processing unit 23, and a control unit 423. In the reception device 411, the tuner 421 is configured such that the IF signal can be output from either of both output terminals that output the BB(I) signal or the BB(Q) signal according to the configuration of the demodulation unit 422.

The tuner 421 includes one chip such as an IC. The tuner 421 selects the frequency of a channel desired by a user under the control of the control unit 423. The tuner 421 amplifies an RF signal of the selected frequency and converts the frequency of the RF signal into a low frequency.

Furthermore, unlike the tuner 221 in FIG. 3, the tuner 421 includes an output terminal that outputs the IF signal, an output terminal that outputs the BB(I) signal or the IF signal, and an output terminal that outputs the BB(Q) signal or the IF signal. Under the control of the control unit 423, the tuner 421 uses an output terminal corresponding to the configuration of the demodulation unit 422 arranged at the subsequent stage among the three output terminals.

The demodulation unit 422 performs demodulation processing in accordance with a control signal supplied from the control unit 423. The demodulation unit 422 includes ADCs 441-1 and 441-2, a demodulation processing unit 442, and an error correction unit 443.

The ADCs 441-1 and 441-2 convert the IF signal, the BB(I) signal, and the BB(Q) signal, which are analog signals supplied from the tuner 421, into digital signals. The ADC 441-1 converts the IF signal or the BB(I) signal into a digital signal, and outputs the converted digital signal to the demodulation processing unit 442. The ADC 441-2 converts the IF signal or the BB(Q) signal into a digital signal, and outputs the converted digital signal to the demodulation processing unit 442.

The demodulation processing unit 442 is basically configured similarly to the demodulation processing unit 42-2 in FIG. 1. The error correction unit 443 is basically configured similarly to the error correction unit 43-2 in FIG. 1.

At the time of channel selection, the control unit 423 performs the "control for switching between terrestrial broadcasting and satellite broadcasting" on the tuner 421.

Note that, in the tuner 421, whether to output a signal of a broadcast wave as the IF signal or as the BB(I) signal and the BB(Q) signal is set in advance at the time of initial setting, as in the tuner 221 in FIG. 6. Furthermore, in a case where the frequency of a channel of the terrestrial broadcasting is selected, whether to output the RF signal of the terrestrial broadcasting from the output terminal of the IF signal, from the output terminal of the BB(I) signal, or from the output terminal of the BB(Q) signal is also set in advance at the time of initial setting.

That is, at the time of power activation, the control unit 423 sets in advance the "control for switching between IF and IQ", "control for switching the terrestrial wave output destination to I", and "control for switching the terrestrial wave output destination to Q" as initial settings.

Note that the "control for switching the terrestrial wave output destination to I" is control for setting whether to set the output destination of the terrestrial wave as the output terminal that outputs the BB(I) signal. In addition, the "control for switching the terrestrial wave output destination to Q" is control for setting whether to set the output destination of the terrestrial wave as the output terminal that outputs the BB(Q) signal.

As described above, in the broadcast receiving system 401, the tuner 421 includes the output terminal that outputs the BB(I) signal or the IF signal and the output terminal that outputs the BB(Q) signal or the IF signal, whereby the demodulation unit 422 can be configured by two ADCs. As a result, the cost of the demodulation unit 422 can be easily reduced.

Configuration Example of Tuner

Figure 13:
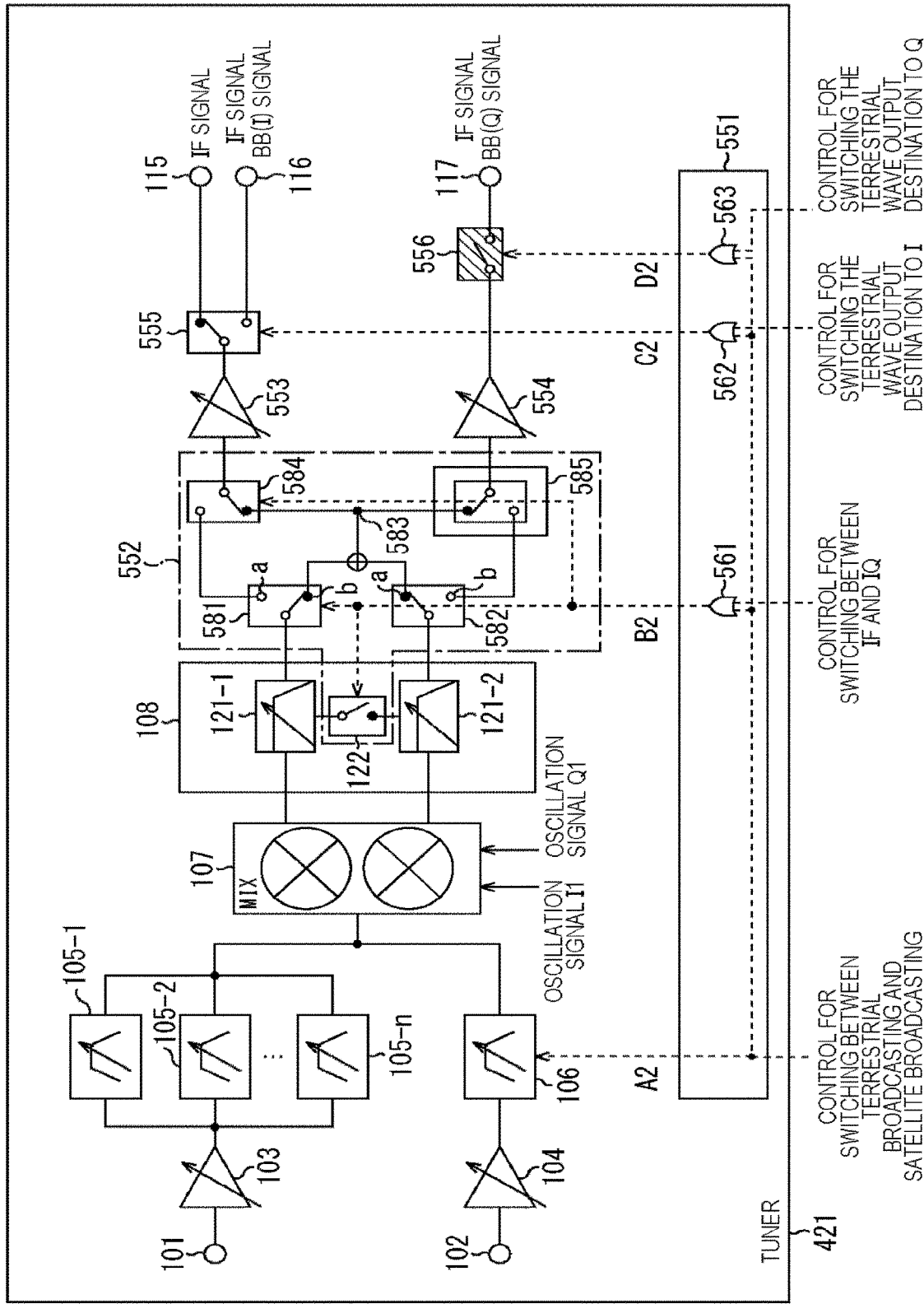
FIG. 13 is a diagram illustrating a configuration example of a tuner in FIG. 12.

FIG. 13 is a diagram illustrating a configuration example of the tuner in FIG. 12.

The tuner 421 in FIG. 13 is different from the tuner 21 in FIG. 2 in that the switch 109, the IQ combiner 110, the switch 111, the IF VGA (IFVGA) 112, and the BB VGAs (BBVGAs) 113 and 114 are removed. Furthermore, the tuner 421 is different from the tuner 21 in FIG. 2 in that a control circuit 551, an IF/IQ switching circuit 552, automatic gain control (AGC) amplifiers 553 and 554, a switch 555, and a switch 556 are added.

Furthermore, the tuner 421 is provided with four internal control lines A2 to D2, each of which is connected from the control circuit 551 to a circuit or a predetermined switch.

The control circuit 551 includes an OR circuit 561, an OR circuit 562, and an OR circuit 563. The internal control line A2 is connected from the control circuit 551 to the RF filter 105 and the RF filter 106. The internal control line B2 is connected from the OR circuit 561 of the control circuit 551 to the IF/IQ switching circuit 552. The internal control line C2 is connected from the OR circuit 562 of the control circuit 551 to the switch 555. The internal control line D2 is connected from the OR circuit 563 of the control circuit 551 to the switch 556.

In the tuner 421 in FIG. 13, as described above, the values of the "control for switching between IF and IQ", the "control for switching the terrestrial wave output destination to I", and the "control for switching the terrestrial wave output destination to Q" are set in advance at the time of initial setting. That is, also in the tuner 421, only the value of the "control for switching between terrestrial broadcasting and satellite broadcasting" is set at the time of channel selection.

The "control for switching between terrestrial broadcasting and satellite broadcasting" is set to L in the case of the terrestrial wave, and is set to H in the case of the satellite wave.

The "control for switching between IF and IQ" is set to L in advance in the case of the IF output, and is set to H in advance in the case of the IQ output. The "control for switching the terrestrial wave output destination to I" is set to L in advance in a case where the output destination is the output terminal 115, and is set to H in advance in a case where the output destination is the output terminal 116. The "control for switching the terrestrial wave output destination to Q" is set to L in advance in a case where the output destination is the output terminal 115, and is set to H in advance in a case where the output destination is the output terminal 117.

The values set in advance for the "control for switching between IF and IQ", the "control for switching the terrestrial wave output destination to I", and the "control for switching the terrestrial wave output destination to Q" and the value set for the "control for switching between terrestrial broadcasting and satellite broadcasting" when the user selects a channel are supplied to the control circuit 551.

The "control for switching between terrestrial broadcasting and satellite broadcasting" is set to L in the case of the terrestrial wave, and is set to H in the case of the satellite wave. Therefore, the internal control line A2 is set to L in the case of the terrestrial wave, and is set to H in the case of the satellite wave.

The value set in advance for the "control for switching between IF and IQ" and the value set for the "control for switching between terrestrial broadcasting and satellite broadcasting" are supplied to the OR circuit 561. In the OR circuit 561, the internal control line B2 is set according to a result of an OR operation of the value set in advance for the "control for switching between IF and IQ" and the value set for the "control for switching between terrestrial broadcasting and satellite broadcasting" when the user selects a channel. Therefore, the internal control line B2 is set to L in a case where the terrestrial wave is received and the IF signal is output, is set to H in a case where the terrestrial wave is received and the IQ signals are output, and is set to H in a case where the satellite wave is received.

The value set in advance for the "control for switching the terrestrial wave output destination to I" and the value set for the "control for switching between terrestrial broadcasting and satellite broadcasting" are supplied to the OR circuit 562. In the OR circuit 562, the internal control line C2 is set according to a result of an OR operation of the value set in advance for the "control for switching the terrestrial wave output destination to I" and the value set for the "control for switching between terrestrial broadcasting and satellite broadcasting" when the user selects a channel. Therefore, the internal control line C2 is set to L in a case where the terrestrial wave is received and the output destination of the IF signal is the output terminal 115, is set to H in a case where the terrestrial wave is received and the output destination of the IF signal is the output terminal 116, and is set to H in a case where the satellite wave is received. Note that, in a case where the terrestrial wave is received and the output destination of the IF signal is the output terminal 117, the internal control line C2 is not set.

The value set in advance for the "control for switching the terrestrial wave output destination to Q" and the value set for the "control for switching between terrestrial broadcasting and satellite broadcasting" are supplied to the OR circuit 563. In the OR circuit 563, the internal control line D2 is set according to a result of an OR operation of the value set in advance for the "control for switching the terrestrial wave output destination to Q" and the value set for the "control for switching between terrestrial broadcasting and satellite broadcasting" when the user selects a channel. Therefore, the internal control line D2 is set to L in a case where the terrestrial wave is received and the output destination of the IF signal is the output terminal 116, is set to H in a case where the terrestrial wave is received and the output destination of the IF signal is the output terminal 117, and is set to H in a case where the satellite wave is received. Note that, in a case where the terrestrial wave is received and the output destination of the IF signal is the output terminal 115, the internal control line D2 is not set.

The internal control line A2 described above is connected to the RF filter 105 and the RF filter 106.

In a case where the internal control line A2 is set to L, the RF filter 105 filters the frequency of the RF signal supplied from the RFVGA 103. In a case where the internal control line A2 is set to H, the RF filter 106 filters the frequency of the first IF signal supplied from the RFVGA 104.

The internal control line B2 is connected to the switch 122 of the complex filter/LPF 108 and the IF/IQ switching circuit 552 arranged at the subsequent stage of the complex filter/LPF 108.

The IF/IQ switching circuit 552 includes a switch 581, a switch 582, an IQ combiner 583, a switch 584, and a switch 585.

In a case where the internal control line B2 is set to L, the complex filter/LPF 108 turns on the switch 122 to share a part of paths, functions as a complex filter, and outputs the IF(I) signal and the IF(Q) signal to the switches 581 and 582. In a case where the internal control line B2 is set to H, the complex filter/LPF 108 turns off the switch 122, functions as an LPF without sharing the paths, and outputs the BB(I) signal and the BB(Q) signal to the switches 581 and 582.

In a case where the internal control line B2 is set to L, the switches 581 and 582 respectively output the IF(I) signal and the IF(Q) signal supplied from the complex filter/LPF 108 to terminals a. In a case where the internal control line B2 is set to H, the switches 581 and 582 respectively output the BB(I) signal and the BB(Q) signal supplied from the complex filter/LPF 108 to terminals b.

The IQ combiner 583 combines the IF(I) signal and the IF(Q) signal supplied from the terminals a of the switches 581 and 582, and outputs the combined IF signal to the switch 584.

In a case where the internal control line B2 is set to L, the switch 584 selects a terminal a and outputs the IF signal supplied from the IQ combiner 583 to the AGC amplifier 553. In a case where the internal control line B2 is set to H, the switch 584 selects a terminal b and outputs the BB(I) signal supplied from the switch 581 to the AGC amplifier 553.

In a case where the internal control line B2 is set to L, the switch 585 selects a terminal a and outputs the IF signal supplied from the IQ combiner 583 to the AGC amplifier 554. In a case where the internal control line B2 is set to H, the switch 585 selects a terminal b and outputs the BB(Q) signal supplied from the switch 582 to the AGC amplifier 554.

The AGC amplifiers 553 and 554 each function as an IFVGA/BBVGA.

The AGC amplifier 553 amplifies the IF signal or the BB(I) signal from the switch 584, and outputs the amplified IF signal or BB(I) signal to the switch 555.

The AGC amplifier 554 amplifies the IF signal or the BB(Q) signal from the switch 585, and outputs the amplified IF signal or BB(Q) signal to the switch 556.

The internal control line C2 is connected to the switch 555 disposed at the subsequent stage of the AGC amplifier 553.

In a case where the internal control line C2 is set to L, the switch 555 selects a terminal a and outputs the IF signal supplied from the AGC amplifier 553 to the output terminal 115. In a case where the internal control line C2 is set to H, the switch 555 selects a terminal b and outputs the IF signal or the BB(I) signal supplied from the AGC amplifier 553 to the output terminal 116.

The internal control line D2 is connected to the switch 556.

The switch 556 functions as a dummy switch for adjusting the balance between the BB(I) signal and the BB(Q) signal. In a case where the internal control line D2 is set to L, the switch 556 is turned off. In a case where the internal control line D2 is set to H, the switch 556 is turned on, and outputs the IF signal or the BB(Q) signal supplied from the AGC amplifier 554 to the output terminal 117.

As described above, in the broadcast receiving system 401, the tuner 421 includes the output terminal that outputs the BB(I) signal or the IF signal and the output terminal that outputs the BB(Q) signal or the IF signal.

As a result, the IF signal can be output from any terminal of the output terminal 115, the output terminal 116, and the output terminal 117, and an output format at the time of terrestrial wave reception can be compatible with either the IF signal or the IQ signals.

Furthermore, since the number of amplifiers of the tuner 421 in FIG. 13 is smaller by one than that of the tuner 221 in FIG. 6, the circuit scale can be smaller and the cost can be reduced.

As described above, according to the third embodiment of the present technology, one type of tuner IC can be compatible with a demodulation LSI having any input format, and chip cost can be reduced.

Note that, in the present specification, a system means a set of a plurality of components (devices, modules (parts), and the like), and it does not matter whether or not all the components are in the same housing. Therefore, a plurality of devices housed in separate housings and connected via a network, and one device in which a plurality of modules is housed in one housing are both systems.

In addition, the effects described in the present specification are merely examples and are not limited, and other effects may be obtained.

Embodiments of the present technology are not limited to the above-described embodiments, and various modifications can be made without departing from the gist of the present technology.

For example, the present technology can take a configuration of cloud computing in which one function is shared and processed in cooperation by a plurality of devices via a network.

Furthermore, each step described in the above-described flowcharts can be executed by one device or shared and executed by a plurality of devices.

Moreover, in a case where one step includes a plurality of sets of processing, the plurality of sets of processing included in the one step can be executed by one device or shared and executed by a plurality of devices.

Combination Examples of Configurations

The present technology can also have the following configurations.

(1)
A tuner IC including:
an IF output terminal configured to output an IF signal that is an output signal of terrestrial broadcasting;
a first output terminal configured to output the IF signal or one of BB signals that are output signals of satellite digital broadcasting and have orthogonal phases; and
a second output terminal configured to output another of the BB signals.

(2)
The tuner IC according to (1), further including
a first switch configured to switch an output destination of the IF signal to the first output terminal or the IF output terminal.

(3)
The tuner IC according to (2), further including
a dummy switch provided at a preceding stage of the second output terminal.

(4)
The tuner IC according to (3), further including
a control circuit configured to control switching of the first switch according to a first control signal that controls switching to the terrestrial broadcasting or the satellite digital broadcasting and a second control signal that controls switching of the output destination to the first output terminal or the IF output terminal, the first control signal being set at a time of channel selection, the second control signal being initially set.

(5)
The tuner IC according to (4), further including:
a second switch configured to switch an output format of the output signal of the terrestrial broadcasting to the IF signal or the BB signals; and a third switch configured to switch an output of the first output terminal to the IF signal or the BB signals, in which
the first output terminal outputs the IF signal or the one of the BB signals as the output signal of the terrestrial broadcasting by switching of the third switch, and
the second output terminal outputs the another of the BB signals as the output signal of the terrestrial broadcasting by switching of the dummy switch.

(6)
The tuner IC according to (5), in which
the control circuit controls switching of the second switch, the third switch, and the dummy switch according to the first control signal and a third control signal that controls switching of the output format to the IF signal or the BB signals, the third control signal being initially set.

(7)
The tuner IC according to (2), in which
the second output terminal outputs the another of the BB signals or the IF signal.

(8)
The tuner IC according to (7), further including
a second switch configured to switch the output destination of the IF signal to the second output terminal.

(9)
The tuner IC according to (8), further including
two amplifiers each provided at a preceding stage of the first switch or the second switch and configured to amplify the IF signal or the BB signals.

(10)
The tuner IC according to (9), further including:
a third switch provided at a preceding stage of each of the amplifiers and configured to switch an output format of the output signal to the IF signal or the BB signals; and
a fourth switch provided at a preceding stage of the first output terminal and configured to switch an output of the first output terminal to the IF signal or the BB signals, in which
the first output terminal outputs the IF signal or the one of the BB signals as the output signal of the terrestrial broadcasting by switching of the fourth switch, and
the second output terminal outputs the IF signal or the another of the BB signals as the output signal of the terrestrial broadcasting by switching of the second switch.

(11)
A reception device including:
a tuner IC including an IF output terminal configured to output an IF signal that is an output signal of terrestrial broadcasting, a first output terminal configured to output the IF signal or one of BB signals that are output signals of satellite digital broadcasting and have orthogonal phases, and a second output terminal configured to output another of the BB signals; and
a demodulation unit including at least a first ADC configured to perform AD conversion on a signal supplied from the first output terminal and a second ADC configured to perform AD conversion on a signal supplied from the second output terminal.

REFERENCE SIGNS LIST

101 RF input terminal
102 First IF input terminal
103, 104 RFVGA
105-1 to 105-*n*, 106 RF filter
107 MIX
108 Complex Filter/LPF
109 Switch
110 IQ combiner
111 Switch
112 IFVGA
113, 114 BBVGA
115 to 117 Output terminal
201 Broadcast receiving system
211 Reception device
221 Tuner
222 Demodulation unit
223 Control unit
241-1, 241-2 ADC
301, 302 Switch
351 Dummy switch
352 Control circuit
361, 362 OR circuit
401 Broadcast receiving system
411 Reception device
421 Tuner
422 Demodulation unit
423 Control unit
441-1, 441-2 ADC
551 Control circuit
552 IF/IQ switching circuit
553, 554 AGC amplifier 555, 556 Switch
561 to 563 OR circuit
581, 582 Switch
583 IQ combiner
584, 585 Switch

The invention claimed is:

1. A tuner integrated circuit (IC) comprising:
an intermediate frequency (IF) output terminal configured to output an IF signal that is an output signal of terrestrial broadcasting;
a first output terminal configured to output the IF signal or one of baseband (BB) signals that are output signals of satellite digital broadcasting and have orthogonal phases;
a second output terminal configured to output another of the BB signals;
a first switch configured to switch an output destination of the IF signal to the first output terminal or the IF output terminal;
a second switch configured to switch an output format of the output signal of the terrestrial broadcasting to the IF signal or the BB signals;
a dummy switch provided at a preceding stage of the second output terminal; and
a control circuit configured to control switching of the first switch according to both a first control signal that controls switching to the terrestrial broadcasting or the satellite digital broadcasting and a second control signal that controls switching of the output destination to the first output terminal or the IF output terminal, the first control signal being set at a time of channel selection, the second control signal being initially set.

2. The tuner IC according to claim 1, further comprising:
a third switch configured to switch an output of the first output terminal to the IF signal or the BB signals, wherein
the first output terminal outputs the IF signal or the one of the BB signals as the output signal of the terrestrial broadcasting by switching of the third switch, and
the second output terminal outputs the another of the BB signals as the output signal of the terrestrial broadcasting by switching of the dummy switch.

3. The tuner IC according to claim 2, wherein
the control circuit is further configured to control switching of the second switch, the third switch, and the dummy switch according to the first control signal and a third control signal that controls switching of the output format to the IF signal or the BB signals, the third control signal being initially set.

* * * * *